(12) United States Patent
Wang et al.

(10) Patent No.: US 12,109,733 B1
(45) Date of Patent: *Oct. 8, 2024

(54) REUSABLE EXPANDABLE MEDIA WITH FLEXIBLE SKIN FOR COMPOSITE MANUFACTURING AND METHODS THEREOF

(71) Applicant: The Boeing Company, Arlington, VA (US)

(72) Inventors: Xiaoxi Wang, Mukilteo, WA (US); Jill Elisabeth Seebergh, Seattle, WA (US); Gary E. Georgeson, Tacoma, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,081

(22) Filed: Mar. 17, 2023

(51) Int. Cl.
| | |
|---|---|
| C08J 9/236 | (2006.01) |
| B29C 33/38 | (2006.01) |
| B29C 35/02 | (2006.01) |
| B29C 35/04 | (2006.01) |
| B29L 31/30 | (2006.01) |

(52) U.S. Cl.
CPC ...... B29C 33/3821 (2013.01); B29C 35/0227 (2013.01); B29C 35/045 (2013.01); *B29C 2035/046* (2013.01); *B29L 2031/3076* (2013.01)

(58) Field of Classification Search
CPC ..... B29C 73/32; B29C 33/46; B29C 33/3821; B29L 2031/30
See application file for complete search history.

(56) References Cited

U.S. PATENT DOCUMENTS

| | | | |
|---|---|---|---|
| 11,046,027 B2 | 6/2021 | Wang et al. | |
| 11,292,208 B2 | 4/2022 | Georgeson et al. | |
| 11,298,892 B2 | 4/2022 | Santiago et al. | |
| 11,325,282 B2 | 5/2022 | Wang et al. | |
| 11,787,914 B2 * | 10/2023 | Wang | B29C 70/54 |
| | | | 521/54 |
| 2016/0229090 A1 * | 8/2016 | Wallen | B28B 13/021 |
| 2020/0039156 A1 * | 2/2020 | Wang | B29C 33/54 |

(Continued)

FOREIGN PATENT DOCUMENTS

EP     3695947 A1     8/2020

OTHER PUBLICATIONS

Extended European Search Report issued May 24, 2024 in corresponding EP Application No. 24161501.2, 7 pages.

*Primary Examiner* — Alison L Hindenlang
*Assistant Examiner* — Debjani Roy
(74) *Attorney, Agent, or Firm* — MH2 Technology Law Group LLP

(57) ABSTRACT

A material system including a plurality of expandable pellets or a monolithic flexible carrier is disclosed, each of which may include a polymer matrix configured to hold an expandable core, and a flexible skin configured to encapsulate the polymer matrix, and where the flexible skin is at least partially permeable with respect to the expandable core or a gas released by the expandable core. Implementations of the material system may include where the polymer matrix may include a thermoplastic polymer. The material system may include a charging source configured to introduce blowing agent. A method of curing a composite part is also described.

20 Claims, 11 Drawing Sheets

(56) References Cited

U.S. PATENT DOCUMENTS

| | | |
|---|---|---|
| 2021/0001519 A1 | 1/2021 | Wang et al. |
| 2022/0169820 A1 | 6/2022 | Wang et al. |
| 2023/0023694 A1 | 1/2023 | Wonisch et al. |

* cited by examiner

REUSABLE EXPANDABLE MEDIA WITH FLEXIBLE SKIN FOR COMPOSITE MANUFACTURING AND METHODS THEREOF

TECHNICAL FIELD

The present disclosure generally relates to the fabrication of composite parts, and more particularly, with systems and methods for the curing of composite parts using expandable media.

BACKGROUND

Composites are tough, light-weight materials created by combining two or more functional components, such as reinforcing fibers bound in a polymer resin. Composite parts may provide structural strength for vehicles and structures. For example, composite stringers and composite panels may be used in aerospace fabrication.

Fabrication of composite parts commonly requires the application of both pressure and heat to complete the curing and consolidation process of the composite part. For example, a composite part preform may lack structural strength before it is cured. Accordingly, forming tooling may be used to press and hold the preform in a desired shape during a curing and consolidation process. However, pressing and holding a preform in a desired shape may be difficult if the preform includes a complex shape or a cavity. The tooling may be difficult to remove and/or the tooling may have difficulties applying an even pressure to the entire preform.

Accordingly, there is a need for systems and methods for the fabrication of composite parts that enhance the consolidation process and are easier to remove, as well as addressing other possible issues.

SUMMARY

The following presents a simplified summary in order to provide a basic understanding of some aspects of one or more examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A material system including a plurality of expandable pellets is disclosed, which can include a polymer matrix configured to hold an expandable core, and a flexible skin configured to encapsulate the polymer matrix, and where the flexible skin is at least partially permeable with respect to the expandable core or a gas released by the expandable core. Implementations of the material system can include where the polymer matrix may include a thermoplastic polymer. The polymer matrix can include at least one of thermoplastic urethane (TPU), polyolefin, fluoropolymers, polyesters, polyimides, polyamide, polycarbonate, acrylonitrile butadiene styrene (ABS), polyvinyl chloride (PVC), polymethyl methacrylate (PMMA), ethylene-vinyl acetate (EVA), polyethylenimine (PEI), polyphenylsulfone (PPSU), polyethersulfone (PESU), polyether ether ketone (PEEK), polyetherketoneketone (PEKK), polyvinylidene fluoride (PVDF), polyphenylene sulfide (PPS), thermoplastic elastomer (TPE), and rubber. The flexible skin may include a thermoplastic elastomer (TPE). The flexible skin can include at least one of silicone, rubber, thermoplastic polyurethane (TPU), polyethylene terephthalate (PET), polycarbonate (PC), and polyethylene (PE). The material system can include a charging source configured to introduce blowing agent into one or more of the expandable pellets. The charging source can include dry ice. The blowing agent can include carbon dioxide. The blowing agent can include air or nitrogen. The charging source further can include a cartridge.

An expandable member system is also disclosed, including an expandable member which can include a polymer matrix configured to hold an expandable core, and a flexible skin configured to encapsulate the polymer matrix and the expandable core, and where the flexible skin is at least partially permeable with respect to the expandable core or a gas released by the expandable core. Implementations of the expandable member system can include where the polymer matrix may include at least one of thermoplastic urethane (TPU), polyolefin, fluoropolymers, polyesters, polyimides, polyamide, polycarbonate, acrylonitrile butadiene styrene (ABS), polyvinyl chloride (PVC), polymethyl methacrylate (PMMA), ethylene-vinyl acetate (EVA), polyethylenimine (PEI), polyphenylsulfone (PPSU), polyethersulfone (PESU), polyether ether ketone (PEEK), polyetherketoneketone (PEKK), polyvinylidene fluoride (PVDF), polyphenylene sulfide (PPS), thermoplastic elastomer (TPE), and rubber. The flexible skin can include at least one of silicone, rubber, thermoplastic polyurethane (TPU), polyethylene terephthalate (PET), polycarbonate (PC), and polyethylene (PE). The expandable member system can include a charging source configured to introduce blowing agent into the expandable member. The charging source further can include a cartridge.

A method of curing a composite part is disclosed, including introducing a blowing agent into an expandable material to place the expandable material in a charged state. The method of curing a composite part also includes contacting the expandable material with an uncured composite part. The method of curing a composite part also includes subjecting the expandable material and the uncured composite part to a first temperature such that the expandable material transitions from a charged state to an activated state. The method also includes maintaining the expandable material at the first temperature and in a charged state until the uncured composite part is cured. The method also includes cooling the expandable material and the cured composite part to a second temperature. The method also includes separating the expandable material from the cured composite material. The method also includes exposing the expandable material to a recovery condition. The method also includes where the expandable material may include a polymer matrix configured to hold the blowing agent, and a flexible skin configured to encapsulate the polymer matrix, and restrict an escape of the blowing agent to control an expansion of the expandable material.

Implementations of the method of curing a composite part can include where the recovery condition may include a third temperature and a period of from about 0.5 hours to about 48 hours, the first temperature is from about 150° C. to about 300° C., the second temperature is from about 25° C. to about 90° C., and the third temperature is from about 25° C. to about 300° C. The method can include storing the expandable material in the charged state after introducing a blowing agent into the expandable material. Storing the expandable material in a charged state may include a fourth temperature of from about 25° C. to about 35° C. for a time from about 24 hours to about 72 hours. The method can include re-charging the expandable material after exposing the expandable material to the recovery condition. Recharging the expandable material can include exposing the expandable material to a re-charging temperature for about 0.5 hours to about 2 hours. The expandable material can include a plurality of pellets. The expandable material may include a flexible carrier.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate examples of the present teachings and together with the description, serve to explain the principles of the disclosure. In the figures.

Figure 1:
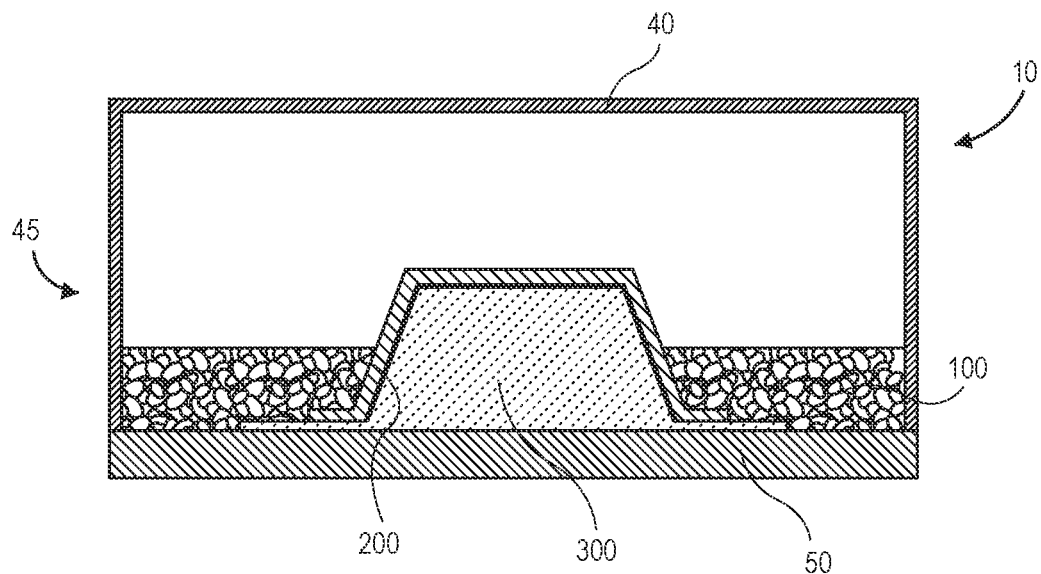
FIGS. 1-2 illustrate a system for curing composites parts according to an implementation of the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary examples of the present teachings, examples of which are illustrated in the accompanying drawings. Wherever possible, the same reference numbers will be used throughout the drawings to refer to the same, similar, or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described unless the context clearly dictates otherwise. In the specification, the recitation of "at least one of A, B, and C," includes implementations containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on." Similarly, implementations of the present disclosure may suitably comprise, consist of, or consist essentially of, the elements A, B, C, etc.

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

Composite parts, such as Carbon Fiber Reinforced Plastic (CFRP) parts, are initially laid-up in multiple layers that together are referred to as a "preform." As used herein the term "uncured composite part" or "preform" refers to one or more plies of composite materials impregnated with resin that is uncured or in some instances partially cured. For example, the uncured composite part may be a fiber-reinforced uncured thermoset polymer composite part. Individual fibers within each layer of the preform may be aligned parallel with each other, but different layers may exhibit different fiber orientations to increase a strength of the resulting composite part along different dimensions. The preform may include a viscous resin that solidifies to harden the preform into a composite part (e.g., for use in an aircraft). Carbon fiber plies that have been impregnated with an uncured thermoset resin or a thermoplastic resin are referred to as "pre-preg." As used herein, the term "pre-preg" refers to pre-impregnated stacks of composite plies, such as epoxy impregnated unidirectional composite tape, woven plies, or chopped pieces of such. A pre-preg may be flexible until it is cured, often by heat and pressure curing or curing within an autoclave. Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may return to a reformable or viscous form if it is re-heated.

With respect to fiber-reinforced thermoset polymer composite parts, curing generally refers to the application of heat and/or pressure to crosslink and consolidate the fibers of a fiber-reinforced thermoset polymer composite part. While thermoset resins can be partially cured (i.e. crosslinked) without the application of pressure, it often results in a poorly consolidated part. Accordingly, as used herein, the terms "cure" and "curing" include both the application of heat (to cure/crosslink) and the application of pressure (to consolidate) fiber-reinforced thermoset polymer composite parts, such as the thermoset composite parts of the present disclosure.

In some implementations, a composite part is cured by subjecting it to heat and/or pressure. The heat and/or pressure may be applied according to a predetermined cure schedule specifying applied pressures, temperatures, and durations for which the pressures and/or temperatures are maintained. In some implementations, the composite part is cured by pressure alone. For example, the composite part may be cured at room temperature with the application of pressure. The pressure may be positive pressure or negative pressure. For example, the pressure may be applied through vacuum. These schedule temperatures and/or pressures are sometimes referred to as the curing temperature profile and the consolidation pressure profile. As used herein, a "maximum curing temperature" refers to the highest temperature in the curing temperature profile and a "maximum curing pressure" refers to the highest pressure in the consolidation pressure profile.

There is a need for systems and methods for the fabrication of composite parts that enhance the even application of pressure during the consolidation process and are easier to remove, among other things.

In general, systems for curing composites parts according to implementations of the present disclosure include a plurality of expandable pellets or media configured to expand and apply a positive and omnidirectional pressure to an uncured composite part during a curing process. Typically, the expandable pellets are disposed on the uncured composite part in an unexpanded state. The expandable pellets can be placed around the uncured composite part and/or within cavities defined by the uncured composite part. During the curing process, the expandable pellets expand applying a positive pressure against the uncured composite part and helping the uncured composite part retain a desired shape during curing. In some implementations, the expandable media can include a single flexible carrier that can be sized proportionally to a composite part and need not necessarily be comprised of a plurality of expandable pellets. Similar to a system including expandable pellets as described herein, a single, monolithic flexible carrier can be used to conform to and apply positive pressure to an uncured composite part. Alternatively, the flexible carrier can contain, encapsulated therein, a plurality of expandable pellets. This flexible carrier can be transported or moved into a variety of enclosures or tooling setups for composite workpieces, configured to provide or apply conformable pressure to the composite workpiece prior to, during, or after curing. All of the expandable media described herein can be considered to be reusable, which includes recharging or reloading the expandable media with a blowing agent or other material by which expansion may be triggered by a triggering event.

In general, a system for curing a composite part, includes a mandrel configured to receive and support the uncured composite part and a plurality of expandable pellets or expandable media disposed on the uncured composite part, wherein the plurality of expandable pellets expandable media are configured to expand and apply a positive pressure to the uncured composite part during a curing process.

As described in more detail below, according to implementations of the present disclosure, a system for curing a composite part includes a mandrel configured to receive and support the uncured composite part, a plurality of expandable pellets or expandable media disposed on the uncured composite part, and a mold configured to hold the mandrel, the uncured composite part, and the expandable media. The plurality of expandable pellets are configured to expand and apply a positive pressure to the uncured composite part according to a change in condition or triggering event. Each of the plurality of expandable pellets or expandable media can include a blowing agent, a polymer matrix configured to hold the blowing agent, and a flexible skin configured to encapsulate the polymer matrix and the blowing agent. The flexible skin can be at least partially permeable with respect to the blowing agent or a gas released by the blowing agent. The flexible skin may be configured to restrict the escape of the blowing agent or the gas released by the blowing agent to control the expansion of each of the plurality of expandable pellets.

Figure 2:
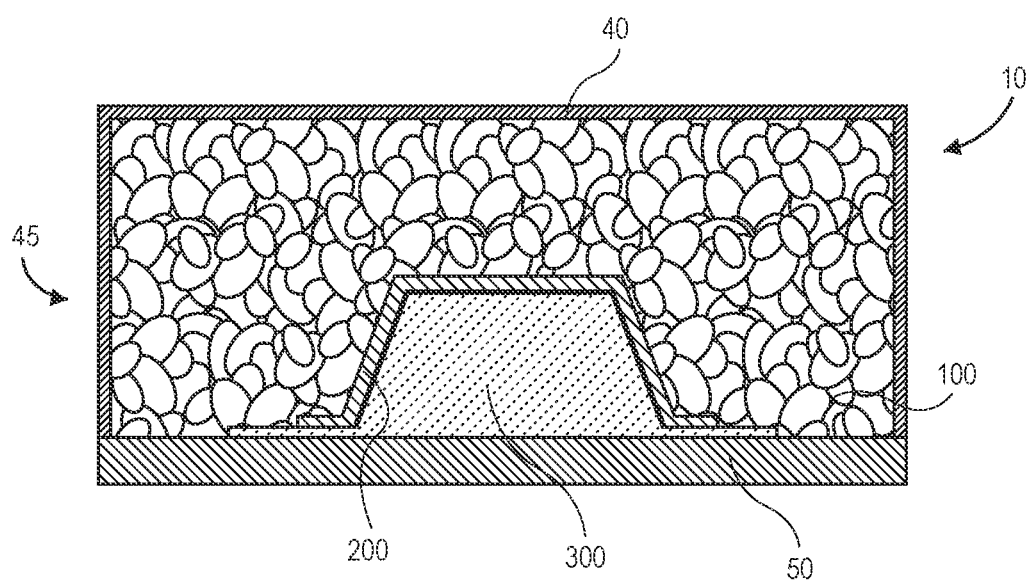

FIGS. 1-2 illustrate a system for curing a composite part according to an implementation of the present disclosure. As illustrated in FIGS. 1-2, a system 10 includes a mold cover 40, a caul plate 50, a mandrel 300, an uncured composite part 200, and a plurality of reusable expandable pellets 100.

In one implementation, the mold cover 40 is configured to attach to the caul plate 50 to form a mold 45. The mold 45 is configured to hold the mandrel 300, the uncured composite part 200, and the plurality of expandable pellets 100. In some implementations, the mold 45 is airtight. In other implementations, the mold 45 is not airtight. For example, the mold 45 may not be separately airtight or capable of holding a consolidation pressure during a curing process. In other examples, the mold 45 is configured to hold the plurality of expandable pellets 100 in an expanded state. The mold 45 may be configured to hold the expandable pellets 100 when expanded such that they can exert a positive pressure on the uncured composite part 200 during a curing process.

While FIGS. 1-2 illustrate the mold 45 as a caul plate 50 and a mold cover 40, the present disclosure is not limited thereto. In other implementations, the mold 45 may be implemented as other devices capable of holding the expandable pellets 100 when expanded such that they can exert a positive pressure on the uncured composite part 200 during a curing process. For example, the mold 45 may be configured as a mesh bag surrounding the mandrel 300, the uncured composite part 200, and the plurality of expandable pellets 100. In other implementations, the mold 45 may be implemented as an airtight or non-airtight oven or an autoclave configured to hold the mandrel 300, the uncured composite part 200, and the plurality of expandable pellets 100.

In one implementation, the mandrel 300 is disposed within the mold 45, and the uncured composite part 200 is laid-up onto an upper surface 330 of the mandrel 300, wherein the plurality of expandable pellets 100 are configured to expand within and against the mold 45 and apply a positive pressure to the uncured composite part 200 during a curing process. For example, as illustrated in FIG. 2, when expanded, the expandable pellets 100 occupy a substantial space within the mold 45 to enforce a desired shape to the uncured composite part 200 during a curing process.

In some implementations, the mandrel 300 can be configured to apply heat to the uncured composite part 200 during a curing process. In some implementations, heat may be applied externally. For example, the system 10 may be placed within a heating oven or autoclave configured to apply heat to the uncured composite part 200 during a curing process. In other implementations, the heat may be applied externally through heat lamps or heating blankets placed over a mesh bag forming the mold 45. In yet other implementations, the curing process may occur at room temperature and the uncured composite part 200 may not be heated.

Figure 3:
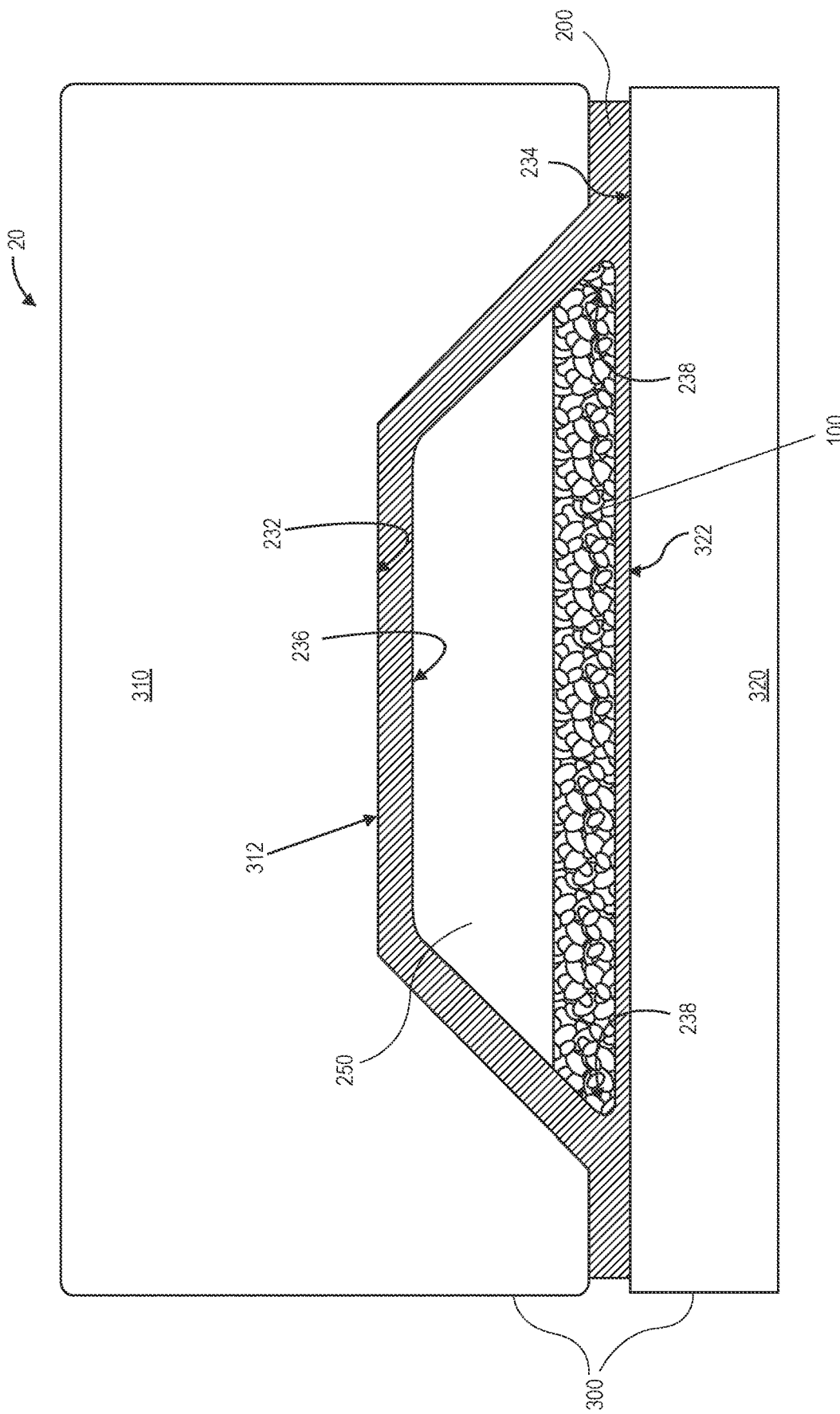
FIGS. 3-4 illustrate a system for curing composites parts according to an implementation of the present disclosure.
Figure 4:
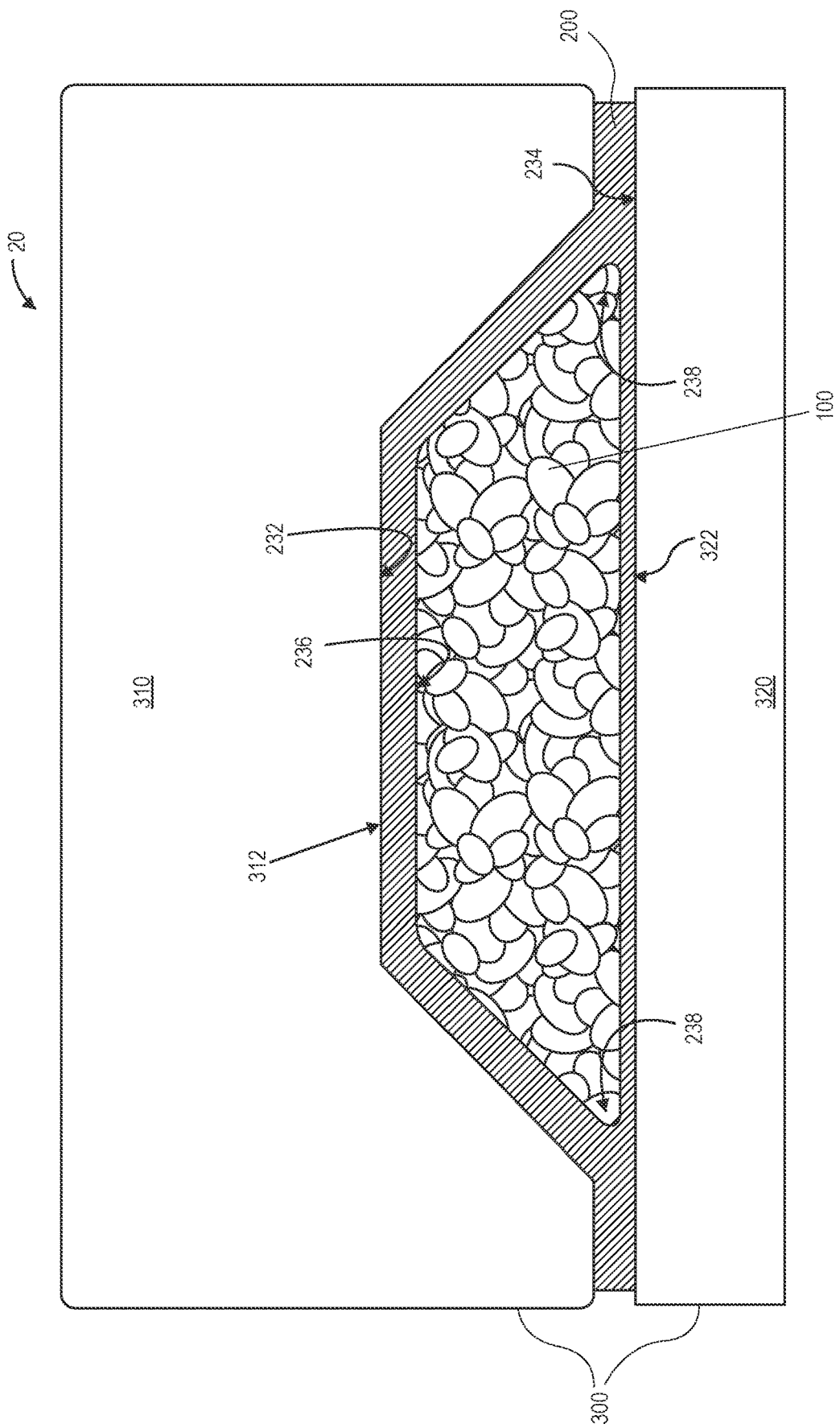

FIGS. 3-4 illustrate a system 20 for curing a composite part according to an implementation of the present disclosure. As illustrated in FIGS. 3-4, a system 20 includes a mandrel 300, an uncured composite part 200, and a plurality of reusable expandable pellets 100.

As illustrated in FIGS. 3-4, the uncured composite part 200 can define one or more internal cavities 250, and the plurality of expandable pellets 100 may be disposed within at least one of the one or more internal cavities 250. The plurality of expandable pellets 100 are configured to expand and at least partially fill the at least one of the one or more internal cavities 250 and apply a positive pressure to the uncured composite part 200 during a curing process.

As illustrated in FIGS. 3-4, the mandrel 300 is configured to receive and support an uncured composite part 200. The mandrel 300 includes an upper mandrel 310 and a lower mandrel 320. An upper portion of the uncured composite part 200 including upper surface 232 may be laid-up onto surface 312 of upper mandrel 310, and a lower portion of the uncured composite part 200 including lower surface 234 may be laid-up onto surface 322 of the lower mandrel 320. Upper mandrel 310 and lower mandrel 320 can then be brought together to enforce a desired shape to the uncured composite part 200 during a curing process.

As illustrated in FIGS. 3-4, the uncured composite part 200 includes an internal cavity 250. The internal cavity 250 can be defined by the boundaries of inner surface 236. As illustrated in FIG. 4, when expanded, the expandable pellets 100 enforce a desired shape to substantially all of the internal cavity 250, including to internal corners 238.

In some implementations, at least one of the upper mandrel 310 and the lower mandrel 320 is configured to heat the uncured composite part 200 during a curing process. In other implementations, the mandrel 300 may not be configured to heat the uncured composite part 200 during a curing process. Instead, heat can be applied externally. For example, the mandrel 300 can be placed within a heating oven or autoclave configured to apply heat to the uncured composite part 200 during a curing process. In other implementations, the curing process can occur at room temperature.

As illustrated in FIGS. 2 and 4, the expandable pellets 100 expand during a curing process. In one implementation, the expandable pellets 100 are configured to expand in response to a predetermined change in condition or triggering event. For example, the expandable pellets 100 can expand in response to a change in temperature, a change in pressure, a chemical reaction, and/or an input of radiative energy (such as, UV light exposure). In some implementations, the expandable pellets 100 expand in response to a single change in condition. For example, a change in temperature. In other implementations, the expandable pellets expand in response to one or more changes in condition or combinations of one or more changes in condition. For example, a change in temperature and a simultaneous change in pressure. Accordingly, the predetermined change in condition includes a change in temperature, a change in pressure, a chemical reaction, and an input of radiative energy (such as, UV light exposure). The predetermined change in condition can also include one or more of a change in temperature, a change in pressure, a chemical reaction, and an input of radiative energy (such as, UV light exposure), and/or combinations thereof.

Figure 5:
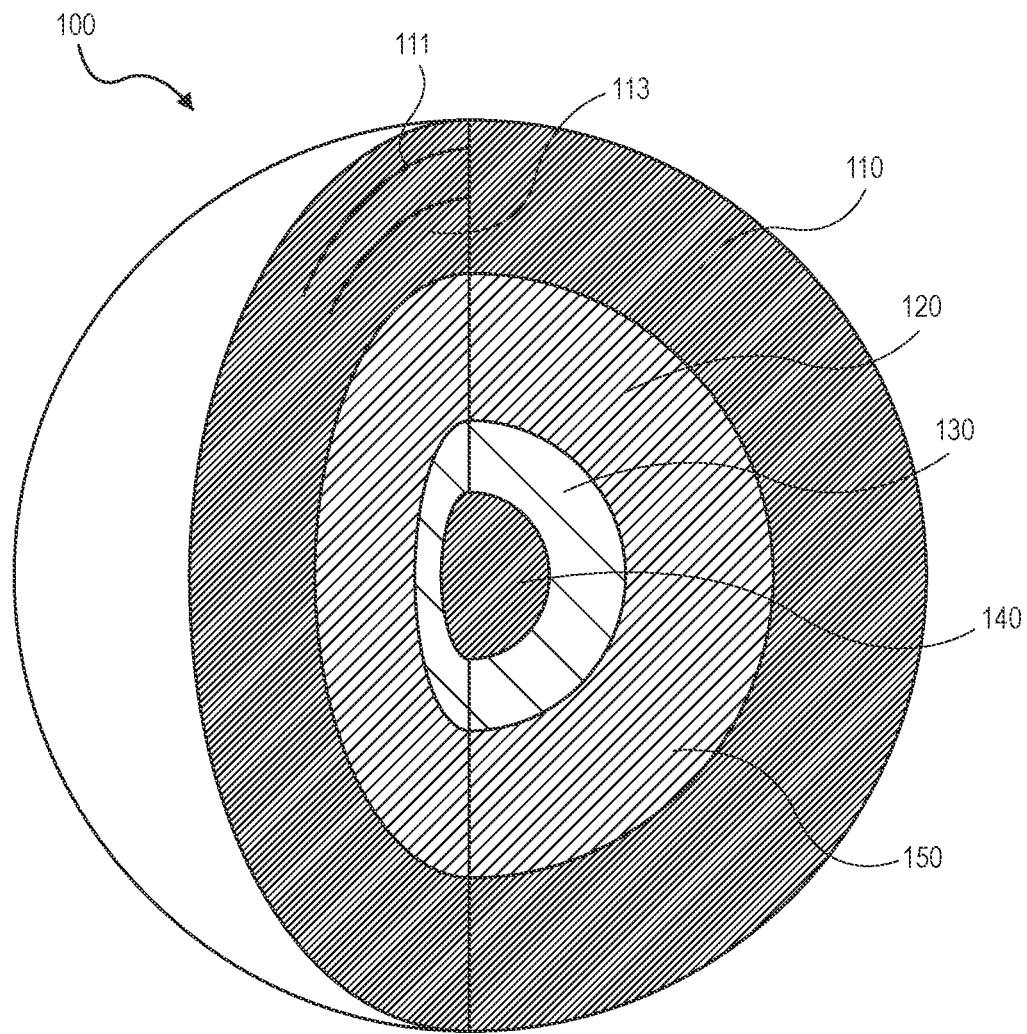
FIG. 5 illustrates a re-usable expandable pellet, according to an implementation of the present disclosure.

FIG. 5 illustrates a re-usable expandable pellet, according to an implementation of the present disclosure. As illustrated in FIG. 5, an expandable pellet 100 includes a flexible skin 110, a polymer matrix 120, and a blowing agent 150. In some implementations, the expandable pellet 100 can further include an expandable core 130 and/or a nucleus 140 which are also held within the polymer matrix 120. The polymer matrix 120 is further configured to hold the blowing agent 150. For example, the polymer matrix 120 can include a free volume within which the blowing agent 150 may be held. In other implementations, the polymer matrix 120 can include a plurality of nanometer-scale voids capable of holding the blowing agent 150. In yet other implementations, the polymer matrix 120 can be formed around or mixed-in with the blowing agent 150. For example, the blowing agent 150 can be a powder, pellets, or a liquid mixed with the polymer matrix 120. In some implementations, the blowing agent 150 can form an expandable core 130 and/or a nucleus 140 around which the polymer matrix 120 is formed. In other implementations, the blowing agent 150 can be dissolved within the polymer matrix 120. In certain implementations, the expandable core 130 does not expand. In these implementations, the expandable core 130 can function to efficiently absorb, store, and release a blowing agent 150. In still other implementations, the polymer matrix 120 and the expandable core 130 can be a single layer or material that provides a reservoir for a blowing agent 150, rather than be present in the expandable pellet or expandable media as discrete, separate layers.

The polymer matrix 120 can include a thermoplastic polymer and/or an elastomeric material. For example, the polymer matrix 120 may include polyurethane (PU), polypropylene (PP), polycarbonate (PC), polyetherimide (PEI), polystyrene (PS), polyphenylene sulfide (PPS), polyvinyl chloride (PVC) and poly(methyl methacrylate) (PMMA), Nylon, Vinyl, etc. In some implementations, the polymer matrix 120 includes high temperature thermoplastic polymers. In other implementations, the polymer matrix 120 includes low temperature thermoplastic polymers.

In some implementations, the polymer matrix 120 includes a single thermoplastic material. For example, the polymer matrix 120 may consist essentially of PMMA. In other implementations, the polymer matrix 120 includes one or more thermoplastic materials or combinations of one or more thermoplastic materials. For example, the polymer matrix may comprise or consist essentially of PVC and PMMA or thermoplastic acrylic-polyvinyl chloride (e.g., Kydex® thermoplastic materials, manufactured by Sekisui SPI, Bloomsburg, PA).

The polymer matrix 120 can be configured not to melt during a curing process. Accordingly, in some implementations, a melting point of the polymer matrix is higher than a maximum curing temperature. For example, the polymer matrix 120 may have a melting temperature of at least 150° F., of at least 200° F., of at least 300° F., or of at least 350° F. In other implementations, the polymer matrix may have a melting temperature from about 50° F. to about 850° F., from about 100° F. to about 600° F., or from about 200° F. to about 400° F. In some implementation, a melting point of the polymer matrix 120 is lower than a melting point of the flexible skin 110.

The polymer matrix 120 can be configured to expand according to an activation of the blowing agent 150. That is, the blowing agent 150 may activate according to a predetermined change in condition or triggering event, and the polymer matrix may expand according to an activation of the blowing agent 150 to expand the expandable pellet 100.

In other implementations, the polymer matrix 120 may not expand according to an activation of the blowing agent 150. Instead, the polymer matrix 120 can be configured to release a gas upon activation of the blowing agent 150, and the release of the gas will expand the flexible skin 110 to expand the expandable pellet 100.

The blowing agent 150 can include a gas or liquid configured to react in response to the predetermined change in condition or triggering event. The blowing agent 150 can be a gas or liquid, such as carbon dioxide, nitrogen, one or more hydrocarbons, water, and/or any other suitable physical and/or chemical blowing agent 150 configured to react in response to a predetermined change in condition or triggering event. In some implementations, a charging source for such a blowing agent 150 can include a solid material charging source, such as, for example, dry ice, whereby carbon dioxide, in this example, is introduced via sublimation. In implementations, the gas may be inert, while in other implementations, the gas may be reactive with one or more elements of the expandable pellet 100.

In other implementations, the blowing agent 150 can include a gas, a powder, a supercritical gas, and/or other components configured to react in response to a predetermined change in condition or triggering event. The blowing agent 150 can include only one gas, one solid, or one liquid. In other implementations, the blowing agent 150 can include combinations of gasses, solids, or liquids, or combinations of gasses, solids, and liquids.

In one implementation, the flexible skin 110 restricts the escape of the blowing agent 150, or a gas released by the blowing agent 150, when the blowing agent 150 is activated, such that the expandable pellet 100 expands and/or maintains an expanded state. For example, the flexible skin 110 is configured to restrict the escape of the blowing agent 150 or the gas released by the blowing agent 150 to control the expansion of the expandable pellets 100.

In one implementation, controlling the expansion of each of the expandable pellets 100 includes at least one of expanding the expandable pellets 100 and maintaining the expanded state of the expandable pellets 100. The expanded state can be maintained for at least one of 20 minutes, 30 minutes, 40 minutes, 60 minutes, 2 hours, or 5 hours.

In some implementations, the blowing agent 150 releases a gas in response to the change in condition or triggering event and a rate of release of the gas by the blowing agent 150 in response to said change in condition or triggering event is higher than a rate of escape of the gas through the flexible skin 110 such that the expandable pellets 100 expand or maintain an expanded state.

In some implementations, the polymer matrix 120 releases the blowing agent 150 in response to a change in condition or triggering event and a rate of release of the blowing agent 150 from the polymer matrix 120 in response to said change in condition or triggering event is higher than a rate of escape of the blowing agent 150 through the flexible skin 110 such that each of the expandable pellets expand or maintain an expanded state.

In some implementations, the blowing agent 150 expands in volume in response to a change in condition or triggering event and a rate of escape of the blowing agent 150 through the flexible skin 110 is such that the expandable pellets expand or maintain an expanded state.

The blowing agent 150 cam be a chemical blowing agent 150 or a physical blowing agent 150. The blowing agent 150 can be a combination of a physical blowing agent 150 and a chemical blowing agent 150, or the blowing agent 150 can consist essentially of a physical blowing agent 150 or a chemical blowing agent 150.

The predetermined change in condition or triggering event can include a change in temperature, a change in pressure, a chemical reaction, an input of radiative energy (such as, UV light exposure), and combinations thereof. For example, a physical blowing agent 150 can enter into a gaseous phase or increase its volume according to a predetermined change in condition, such as a change in temperature. A chemical blowing agent 150 can release a gas according to a change in condition, such as a change in temperature, a chemical reaction, or exposure to UV light.

In some implementations, the predetermined change in condition is a single change in condition. In other implementations, the predetermined change in condition includes one or more changes in condition or combinations of one or more changes in condition.

In some implementations, the blowing agent 150 includes one or more chemical blowing agents 150. The chemical blowing agent 150 can be compounded or mixed in with the polymer matrix 120. For example, the chemical blowing agent 150 can be a powder, pellet, or liquid mixed with the polymer matrix 120. In other implementations, the polymer matrix 120 may act as a carrier for the chemical blowing agent 150.

Upon activation, a chemical blowing agent 150 can be configured to release a gas according to a change in condition or a chemical reaction. At least one of the polymer matrix 120, the flexible skin 110, and the expandable pellet 100 expands according to said release of gas.

The expansion of the expandable pellet 100 can be controlled by the balance between the release of gas by the chemical blowing agent 150 in the polymer matrix 120 and the escape of the gas released by the chemical blowing agent 150 from the expandable pellet 100 through the flexible skin 110. Accordingly, a rate of the gas released by the chemical blowing agent 150 in response to a predetermined change in condition or triggering event is lower than a rate of escape of the gas released by the chemical blowing agent 150 through the flexible skin 110.

In some implementations, the flexible skin 110 is impermeable to the gas released by the chemical blowing agent 150. In other implementations, the gas released by the chemical blowing agent 150 can diffuse through the flexible skin. However, the rate of diffusion through the flexible skin 110 may be lower than the rate of gas released by the chemical blowing agent 150 when activated, such that the expandable pellet 100 expands and/or maintains an expanded state. In one implementation, the flexible skin 110 restricts the escape of gas released by the chemical blowing agent 150 when activated such that the expandable pellet 100 expands and/or maintains an expanded state. For example, the rate of gas release by the blowing agent in response to a predetermined change in condition or triggering event is 2 times higher, 5 times higher, 10 times higher, or 20 times higher than a rate of escape of the gas released by the chemical blowing agent 150 through the flexible skin 110.

In some implementations, the expandable pellet maintains an expanded state during an entire curing cycle. For example, the expandable pellet 100 can remain expanded for at least 10 minutes, for at least 20 minutes, for at least 30 minutes, and for at least 1 hour. The expandable pellet 100 can remain expanded for from about 10 minutes to about 2 hours. The expandable pellet 100 maintains an expanded state at the curing temperature.

A chemical blowing agent 150 may not be rechargeable. That is, once an amount of gas is released according to a change in condition or triggering event, the chemical blowing agent 150 may be spent and no longer capable of producing additional gas.

The chemical blowing agent 150 can include isocyanate, azodicarbonamide, hydrazine, toluenesulfonyl-semicarbaside, sodium bicarbonate, citric acid, and others. Other usable materials for a chemical blowing agent 150 can include benzene sulfonyl hydrazide, 5-phenyltetrazole, dinitrozopentamethylentetraamin. In implementations where reusable expandable media, reusable expandable members, or reusable expandable pellets 100 are utilized, the chemical blowing agent can be recharged via a reversible chemical reaction that can be triggered by one or more external factors through the flexible skin such as, but not limited to a temperature change or exposure to radiation, i.e., ultraviolet radiation. Exemplary examples of reversible chemical reactions include those that produce gas, for example, the Haber process. Such reversible reactions, when occurring in closed systems will reach equilibrium, and changes in temperature and pressure will drive the forward and reverse reactions according to Le Chatelier's Principle, so one skilled in the art could employ such reactions in combination with the present teachings to control the expansion and contraction of expandable pellets 100 or other expandable media disclosed herein. In other examples, bicarbonates can be used as chemical blowing agents to reversibly evolve and recharge gas within an expandable member. In certain implementations, no chemical blowing agent 150 is present.

In other implementations, the blowing agent 150 includes one or more physical blowing agents 150. The physical blowing agent 150 can be mixed in or held by the polymer matrix 120. For example, the physical blowing agent 150 may be a gas held within the free space or interstitial voids of the polymer matrix 120. In some implementations, the polymer matrix 120 may act as a carrier for the physical blowing agent 150 or the physical blowing agent 150 may be dissolved in the polymer matrix 120. For example, a physical blowing agent 150 may be dissolved in the polymer matrix 120 until a saturation state is reached. The physical blowing agent 150 can be activated according to a change in condition or triggering event, such as a change in temperature. For example, an increase in temperature may lower the solubility of the physical blowing agent 150 in the polymer matrix 120, driving the physical blowing agent 150 out of the polymer matrix 120 and/or expand the volume of the physical blowing agent 150. At the same time, the elevated temperature (usually higher than the glass transition temperature Tg of the polymer matrix 120) softens the polymer matrix 120. The oversaturated physical blowing agent 150 may then nucleate in the softened polymer matrix 120 and lead to bubble growth and/or expansion of the polymer matrix 120, increasing the volume of the polymer matrix 120, the flexible skin 110, and the expandable pellet 100.

The expansion of the expandable pellet 100 can be controlled by the balance between the release of physical blowing agent 150 from the polymer matrix 120 and the escape of the physical blowing agent 150 from the expandable pellet 100 through the flexible skin 110. Accordingly, a rate of release of the physical blowing agent 150 from the polymer matrix 120 in response to a predetermined change in condition or triggering event is lower than a rate of escape of the physical blowing agent 150 through the flexible skin 110. For example, the rate of release of physical blowing agent 150 in response to a predetermined change in condition or triggering event is 2 times higher, 5 times higher, 10 times higher, or 20 times higher than a rate of escape of the physical blowing agent 150 through the flexible skin 110.

In some implementations, the flexible skin 110 is impermeable to the physical blowing agent 150. In other implementations, the physical blowing agent 150 can diffuse through the flexible skin 110. However, the rate of diffusion through the flexible skin 110 can be lower than the rate of released of the physical blowing agent 150 from the polymer matrix 120 when activated, such that the expandable pellet 100 expands and/or maintains an expanded state. In one implementation, the flexible skin 110 restricts the escape of the physical blowing agent 150 when activated such that the expandable pellet 100 expands and/or maintains an expanded state. For example, the expandable pellet maintains an expanded state during an entire curing cycle. In some implementations, the expandable pellet 100 can remain expanded for at least 10 minutes, for at least 20 minutes, for at least 30 minutes, and for at least 1 hour. The expandable pellet 100 can remain expanded for from about 10 minutes to about 2 hours. The expandable pellet 100 maintains an expanded state at the curing temperature.

The physical blowing agent 150 can include a physical agent capable of thermal expansion, such as a chlorofluorocarbon, a hydrochlorofluorocarbon, a hydrocarbon, or liquid CO2, water vapor, among others. Other usable materials for a physical blowing agent 150 may include inert non-flammable gases such as carbon dioxide, helium, and nitrogen, flammable gases and materials such as propane, butane, isobutane, pentane, ethanol, DME, LPG, and the like, and chemical blowing agents such as chlorofluorocarbons (CFCs), hydrochlorofluorocarbons (HCFCs), and hydrofluorocarbons (HFCs).

A physical blowing agent 150 can return to its original state after the predetermined change in condition or triggering event. For example, when the physical blowing agent 150 exits the polymer matrix 120 or expands the polymer matrix 120 according to a change in temperature, the physical blowing agent 150 can return to its original condition or volume after it cools. In some implementations, the polymer matrix 120 and the expandable pellet 100 can keep an expanded shape without significant shrinkage after activation of the blowing agent 150. For example, the polymer matrix 120 and the expandable pellet 100 can remain in a plastically deformed and expanded state after the blowing agent 150 returns to its initial state and/or cools down. In other implementations, the polymer matrix 120 and the expandable pellet 100 can collapse or elastically return to their original size and shape after the physical blowing agent 150 returns to its initial state and/or cools down.

In some implementations, the expandable pellets 100 are deformable. For example, an expandable pellet 100 can be at least partially deformable after, during, and/or before reaction of the blowing agent 150. A degree of deformability allows expandable pellets 100 to squeeze into small gaps that might otherwise exist between expandable pellets 100, between expandable pellets 100 and inner or outer surfaces of the uncured composite part 200, and/or between the expandable pellets 100 and the mold 450 or mandrels 300. Filing these gaps allows the plurality of expandable pellets 100 to present a substantially smooth surface to the uncured composite part 200 and more evenly apply a positive pressure to the uncured composite part 200.

The blowing agent 150 can include a functional additive to further facilitate foaming. For example, when the blowing agent 150 includes a gas, the functional additive to further facilitate foaming can be a material that facilitates formation of a foam, such as, a surfactant. Suitable foaming agents can include sodium laureth sulfate (SLS), sodium lauryl ether sulfate (SLES), sodium lauryl sulfate (also known as sodium dodecyl sulfate or SDS), and ammonium lauryl sulfate (ALS), among others.

The blowing agent 150 can be introduced into the expandable pellet 100 under pressure when the blowing agent 150 is a gas or a liquid. The ability of the polymer matrix 120 to hold the blowing agent 150 depends on the solubility of the blowing agent 150 with respect to the polymer matrix 120. Generally, lower temperature leads to lower diffusivity and higher solubility, similarly, higher temperature results in higher diffusivity and lower solubility.

Accordingly, the polymer matrix 120 can be "charged" with the blowing agent 150 at lower temperatures, such as room temperature, for a long period of time (hours to days) in a high-pressure environment, for example, at 5 MPa for CO2, so that the polymer matrix 120 will absorb enough gas and reach a steady state with the polymer matrix 120 containing a predetermined gas concentration. When heated, the steady state breaks, and due to the lower solubility, the blowing agent 150 may be driven out of the free volume of the polymer matrix 120 and/or increase in volume, expanding the expandable pellet 100. In some implementations, the polymer matrix 120 acts as a reservoir to hold and release the blowing agent 150. The flexible skin 110 acts as a barrier to slow down the gas diffusion of the blowing agent 150 out of the expandable pellets 100 to allow continuous volume increase of the expandable pellet 100 without collapsing and/or maintain an expanded state of the expandable pellets 100 in response to the change in condition or triggering event. The flexible skin 110 further acts to encapsulate the flexible skin 110, which is further configured to surround and encapsulate the polymer matrix 120, meaning that the skin will contain the expandable core 130 as well, stretching and expanding along with the expandable core 130 during operation and use of the expandable pellet 100. An exemplary implementation of a flexible skin 110 includes a high break-at-elongation as an important property for the flexible skin 110. The flexible skin 110 is also a barrier layer between the inner components of the recycle expandable pellet 100 and an external atmosphere that is at least partially permeable with respect to the expandable core 130 or a gas released by the expandable core 130.

In one implementation, the flexible skin 110 allows the blowing agent 150 to diffuse through it to charge the polymer matrix. The solubility of the polymer matrix 120 with respect to the blowing agent 150 is high enough to hold an amount of blowing agent 150 sufficient to expand the expandable pellet 100. For example, the polymer matrix 120 is configured to hold sufficient blowing agent 150 such that the expandable pellets 100 can apply a positive pressure to the uncured composite part 200 during a curing process when in an expanded state. For example, the polymer matrix 120 of each expandable pellet 100 may hold sufficient blowing agent 150 to expand the expandable pellet 100 from about 1.2 to about 100 times the original volume of the expandable pellet 100. The polymer matrix 120 may hold sufficient blowing agent 150 to expand the expandable pellet 100 1.2 times, 2 times, 3 times, 4 times, 5 times, 6 times, 7 times, 8 times, 9 times, or 100 times the original volume of the expandable pellet 100. The polymer matrix 120 may hold sufficient blowing agent 150 to expand the expandable pellet 100 at least 2 times, 4 times, 6 times, 8 times, or 100 times the original volume of the expandable pellet 100. The polymer matrix 120 may hold sufficient blowing agent 150 to expand the expandable pellet 100 from about 1.2 times to about 100 times the original volume of the expandable pellet 100.

The charging of the polymer matrix 120 can start at a high temperature such that the blowing agent 150 may quickly diffuse into the polymer matrix 120 via the flexible skin 110. The charging of the polymer matrix 120 can continue at low temperature, such as room temperature, to ensure that more blowing agent 150 is absorbed by the polymer matrix 120.

In some implementations, the expandable pellets 100 can be re-charged after a curing cycle. For example, the physical blowing agent 150 can be rechargeable. That is, the polymer matrix 120 can be recharged with physical blowing agent 150 after a curing cycle. The polymer matrix 120 can be recharged with physical blowing agent 150 in an amount sufficient to replace the blowing agent 150 that escaped through the flexible skin 110 during the curing process. In other implementations, the polymer matrix 120 may be recharged with physical blowing agent 150 in an amount sufficient to expand the expandable pellet 100 from about 1.2 to about 100 times the original volume of the expandable pellet 100. It should be noted that various materials comprising the expandable pellet 100 or other expandable media as described herein may influence the amount of expansion of the expandable pellet 100 or other expandable media.

Illustrative examples can include polyethylene terephthalate (PET) which may enable an expansion of from about one times to about 15 times the original volume. It should be known to one skilled in the art that various materials possess characteristic elastic or expansion properties contributing to the amount of expansion imparted to an expandable material made therefrom or that various loadings or dosages of physical or chemical blowing agents will further influence an expansion ratio of an expandable pellet, and also enable one to tailor a generated pressure range of the expandable media. For example, PET, with 15% of the weight percentage of the physical blowing agent $CO_2$, can expand five times in volume, while PET with 20% of $CO_2$ can expand 10 times.

The flexible skin 110 is configured to encapsulate the polymer matrix 120 and the blowing agent 150. In addition, the flexible skin 110 is also configured to expand. For example, the flexible skin 110 is configured to expand according to an expansion of the polymer matrix 120. In other implementations, the flexible skin 110 is configured to expand according to an expansion of the blowing agent 150 and/or a release of gas by the blowing agent 150. In one implementation, the polymer matrix 120 and the blowing agent 150 expand according to a predetermined change in condition or triggering event as described above. As the flexible skin 110 encapsulating the polymer matrix 120 and the blowing agent 150 expands it increases the volume of the expandable pellet 100.

The flexible skin 110 can be a flexible material with high elongation and high tear resistance properties to prevent tearing during expansion of the expandable pellet 100. For example, the flexible skin 110 may be configured to have a 20% higher break than the polymer matrix 120. In other implementations, the flexible skin 110 may be configure to expand from about 1 to about 100 times its original volume without tearing. For example, the flexible skin 110 may expand to 1.7 times its original volume without tearing.

The flexible skin 110 can include a flexible material such as silicon, rubber, polyurethane (PU), polyethylene (PE), etc. For example, the flexible skin 110 can include a thermoplastic elastomers (TPE), such as thermoplastic polyurethane (TPU).

In some implementations, the flexible skin 110 includes a single flexible material. For example, the flexible skin 110 can consist essentially of TPU. In other implementations, the flexible skin 110 includes one or more flexible materials or combinations of one or more flexible materials. For example, the flexible skin 110 may comprise or consist essentially of silicone and rubber.

The flexible skin 110 can include one or more layers. For example, as illustrated in FIG. 5, the flexible skin 110 may include an outer layer 111 and an inner layer 113. The outer layer 111 may be an exterior layer of the expandable pellet 100 and the inner layer 113 can be in contact with the polymer matrix 120. The flexible skin 110 can include one or more functionalized layers. In some implementations, at least one of the one or more layers is functionalized. For example, a layer may be functionalized to affect the roughness, gloss, bond-ability, texture, and aesthetic appearance of the flexible skin 110. In one implementation, the outer layer 111 may be functionalized to stretch without breaking. In another implementation, the inner layer 113 may be functionalized to enhance an adhesion to the polymer matrix 120.

For example, the flexible skin 110 can be Teflon-coated to reduce an adhesion between the expandable pellets 100, and the outer layer 111 may include PTFE (e.g., Teflon®, commercially available from The Chemours Company, Wilmington, Delaware).

The flexible skin 110 is configured not to melt during a curing process. Accordingly, a melting point of the flexible skin 110 is higher than a maximum curing temperature. For example, the flexible skin 110 can have a melting temperature higher than a curing temperature of the uncured composite part 200. In one implementation, the flexible skin 110 has a melting temperature at least 20° F. higher than a curing temperature of the uncured composite part 200. For example, the flexible skin 110 has at least a 370° F. melting temperature for a composite part with a 350° F. curing temperature and the flexible skin 110 has at least a 270° F. melting temperature for a composite part with a 250° F. curing temperature.

In some implementations, the melting temperature of the flexible skin 110 is from about 80° F. to about 800° F. For example, the flexible skin 110 may have a melting temperature from about 80° F. to about 270° F., from about 80° F. to about 370° F., or from about 270° F. to about 370° F.

The flexible skin 110 is configured to limit a diffusion of the blowing agent 150 or a gas released by the blowing agent 150 through the flexible skin 110. For example, the flexible skin 110 can be substantially impermeable with respect to the blowing agent 150 or the gas released by the blowing agent 150. In one implementation, the flexible skin 110 is airtight and the blowing agent 150 (or a gas released by the blowing agent 150) cannot substantially diffuse through the flexible skin 110.

In other implementations, the flexible skin 110 is configured to control a diffusion of the blowing agent 150 (or a gas released by the blowing agent 150) through the flexible skin 110 to maintain a pressure within the expandable pellet 100. For example, the flexible skin 110 is at least partially permeable with respect to the blowing agent 150 or the gas released by the blowing agent 150. The flexible skin 110 can be configured to allow blowing agent 150 (or a gas released by the blowing agent 150) to diffuse out of the expandable pellet 100 to maintain a predetermined pressure within the expandable pellet 100 in response to the predetermined change in condition.

In other implementations, the flexible skin 110 is at least partially permeable with respect to the blowing agent 150 to allow for recharging of the expandable pellet 100 as described above. For example, the flexible skin 110 may be configured to allow the recharging of the polymer matrix 120 with blowing agent 150.

As illustrated in FIG. 5, in some implementations the expandable pellet 100 can include an expandable core 130. The expandable core 130 can be core configured to enhance a formation of the expandable pellet 100. In some implementations, the blowing agent 150 can form the expandable core 130. For example, the expandable core 130 can serve as a base to facilitate formation of the polymer matrix 120 and the flexible skin 110 surrounding the expandable core 130. In other implementations, the expandable core 130 can be configured to enhance removal of the expandable pellet 100. For example, the expandable core 130 can include a metal nucleus 140 to facilitate the magnetic removal of the expandable pellets 100 from the system 10. In other implementations, the expandable core 130 can include a plurality of metallic particles (not illustrated) to facilitate the magnetic removal of the expandable pellets 100 from the system 10.

The expandable core 130 can include a polymer material, such as polycarbonate (PC), polyethylene terephthalate (PET), polystyrene (PS), polyethylene (PE), polypropylene (PP), polyetherimide (PEI), etc.

The metal nucleus 140 may include magnetically attractable materials or particles, such as Fe, Co, and Ni. In other implementations, at least one of the expandable core 130 or the nucleus 140 include ferromagnetic materials. In some implementations, the metal nucleus 140 comprises metal particles incorporated into the polymer material forming the expandable core 130.

The terms pellet and particle can be used interchangeably. Varying sizes of pellets may be used, but the size or average size of the pellet is not an essential feature for the examples described herein to function. For example, the pellets may comprise fine particles or larger pellets. An expandable pellet 100 can, for example, have a particle size from about 0.5 mm to about 10 mm. For example, an expandable pellet 100 have a particle size from about 1 mm to about 5 mm, from about 1.5 mm to about 2.5 mm, or of about 2 mm. A population of expandable pellets 100 may have an average particle size from about 1 mm to about 5 mm, from about 1.5 mm to about 2.5 mm, or of about 2 mm. Particle size may reference the largest diameter of a particle. Given the range of sizes of the expandable pellet 100, large particle screening methods can be utilized, such as visual observation techniques including optical microscopy, scanning electron microscope, high-resolution static image analysis, dynamic image analysis, and other techniques known to one skilled in the art. Other classification methods known to one skilled in the art, for example, vibratory screening or sieving can be used to sort and/or measure the expandable pellets 100. In examples, the use of smaller pellets may necessitate the use of a larger quantity of pellets for a given application, or the use of larger pellets may necessitate the use of a smaller quantity of pellets for a similar application. However, the quantities, sizes, and details of the pellets would be known and understood by one skilled in the art. As the expandable pellets 100 of the present disclosure are reusable, it should be noted that average or individual particle size can be dependent on the state of the expandable pellet, for example, a charged state or recovery state.

In one implementation, the flexible skin 110 further allows the blowing agent 150 to be reintroduced, by diffusion, through it to recharge the polymer matrix 120 that holds the expandable core of the expandable pellet 100. In such a manner, the expandable pellets 100 can be reused to apply a positive pressure to another uncured composite part during a curing process when in an expanded state. For example, the polymer matrix 120 of each expandable pellet 100 may hold sufficient blowing agent 150 on successive recharging operations to expand the expandable pellet 100 from about 1.2 to about 100 times the original volume of the expandable pellet 100. The polymer matrix 120 may hold sufficient blowing agent 150 to expand the expandable pellet 100 1.2 times, 2 times, 3 times, 4 times, 5 times, 6 times, 7 times, 8 times, 9 times, 10 times, or 100 times the original volume of the expandable pellet 100. The polymer matrix 120 can hold sufficient blowing agent 150 to expand the expandable pellet 100 at least 2 times, 4 times, 6 times, 8 times, 10 times, or 100 times the original volume of the expandable pellet 100. The polymer matrix 120 can hold sufficient blowing agent 150 to expand the expandable pellet 100 from about 1.2 times to about 100 times the original volume of the expandable pellet 100. One of the main points for this implementation is the recharging and of the expandable tooling in the same location, as opposed to having to recycle expandable pellet 100 in a separate facility. In this manner, both foaming and non-foaming blowing agent 150 can be utilized. It should be further noted that the expandable pellet 100 need not be spherical and can be or have alternative shapes, not limited to, but including rice, football, tablet, capsule, and the like. It should be noted that while certain applications may benefit from alternate shapes, the expandable pellets, when expanded, may or may not retain the original shape upon expansion during use.

Figure 6:
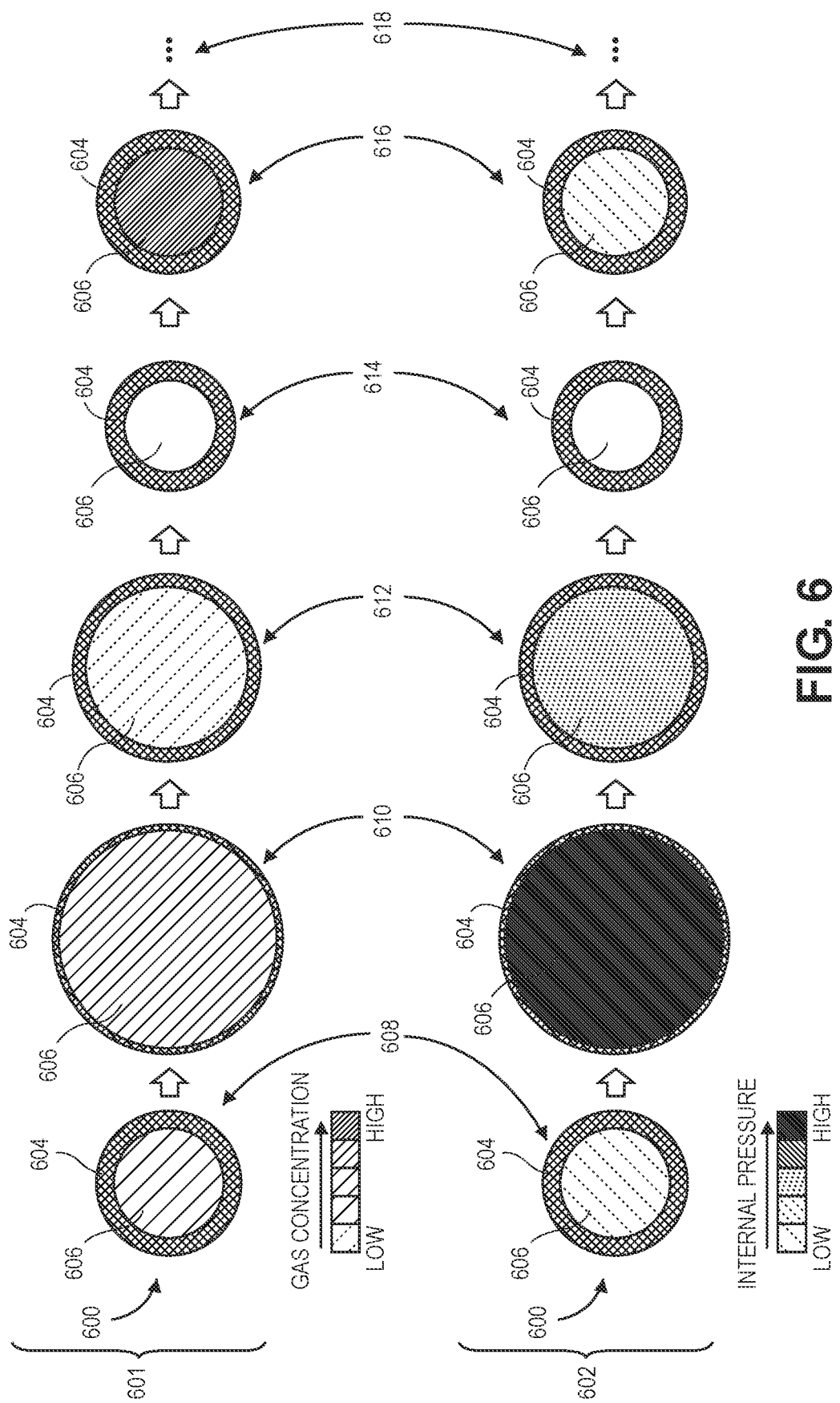
FIG. 6 depicts a schematic process for use of a re-usable expandable pellet, according to an implementation of the present disclosure.

FIG. 6 depicts a schematic process for use of a re-usable expandable pellet, according to an implementation of the present disclosure. As illustrated in FIG. 6, a gas concentration profile 601 for a process for a re-usable expandable pellet and an internal pressure profile 602 for a process for a re-usable expandable pellet 600 are depicted during the curing and formation of an initially uncured composite part 200, showing how gas concentration profile 601 and internal pressure profile 602 are modified or changed on a relative (low to high) scale during use and re-use of the expandable pellets 600 as described herein. It should be noted that internal pressure refers to the accumulative omnidirectional pressure against the flexible skin of each pellet. It should be further noted that the expandable pellets 600 shown in each of the two process profiles 601, 602 are not as fully described in FIG. 6 in regard to their complete features, for purposes of clarity. Each pellet at each stage in the gas concentration profile 601 for a process for a re-usable expandable pellet 600 and the internal pressure profile 602 for a process for a re-usable expandable pellet 600 show the flexible skin 604 and expandable core 606 of each pellet during each phase of the process. It should be noted that while the illustrations shown depict a spherical expandable media, the flexible nature of skin allows material to expand to conform to shape of tool, and the expandable media may not be spherical when in the various states depicted in FIG. 6. Furthermore, while various sizes, pressures, and gas concentrations are depicted, these are not necessarily to scale, and temperature, pressure, and gas concentration behavior are not necessarily proportional during different phases of the processes shown.

As shown in FIG. 6, when the expandable pellets 600 are charged at room temperature 608 with a blowing agent, it is shown that the expandable core 606 is at a low-to-medium gas concentration and internal pressure. Internal pressure refers to an accumulative omnidirectional pressure against the flexible skin of one or more pellets, or in certain examples, against the encapsulating film or flexible carrier of an expandable member or media as described herein. Upon activation or expansion of the expandable pellets 600 at the cure temperature 610 the gas concentration within the expandable core 606 increases as compared to when charged at room temperature 608. This state of expansion of the expandable pellets 600 at the cure temperature 610 reflects an increased gas concentration and internal pressure which is necessary for providing pressure within a molding process for curing a composite part under sufficient pressure imparted by the re-usable expandable pellets 600. After maintaining the pressure at this level for a period of cure time at the higher cure temperature, which can range from about one minute to about 120 minutes, the part is cooled to a lower temperature for de-tooling. Once the expandable pellets 600 are de-tooled or removed from the mold 612 or fixturing for forming the composite part, the gas concentration and internal pressure of the expandable core 606 are reduced as compared to when the expandable pellet 600 was in a state of expansion of the expandable pellets 600 at the cure temperature 610. Next, the expandable pellets 600 are subjected to conditions of recovery at a recovery temperature 614, returning the expandable pellets 600 and the expandable core 606 to its lowest states of gas concentration and internal pressure. Recovery temperature may also range from about room temperature to the melting temperature of the expandable core 130 or the polymer matrix 120 of an expandable pellet 100. Finally, the expandable pellets 600 are subjected to recharging at a charging temperature 616, increasing the expandable core 606 to a maximum gas concentration and an increased internal pressure. This stage would be followed by a storage period in some implementations, or by a repeat 618 of the process steps reflected in FIG. 6, or both. A repeat 618 of the process may be utilized for a re-usable expandable media to re-use and re-cycle the expandable pellets or expandable media several times. It should be noted that times and temperatures reflect a nominal process condition, but that the processes described in FIG. 6 and in regard to other figures herein are not necessarily limited to the times and temperatures noted. These times and temperatures may include other times and temperatures and ranges as stated and described herein. For example, a suitable gas concentration can be from about 1 to about 50 percent, based on a weight of the expandable media. Internal pressure can be from about 10 to about 100 psi, or from about 30 to 40 psi, or from about 70 to about 90 psi. In exemplary implementations, charging time can be from about 1 hour to about 72 hours with a charging temperature of from about −200° C. to about 300° C. In implementations, activation time can be from about 1 second to about 30 minutes, with an activation temperature of from about room temperature to about 300° C., depending on the required cure temperature for the component part. De-tooling time can be from about 10 minutes about 3 hours, with a de-tooling temperature of from about room temperature to about 200° C. In implementations, recovery time can be from about 1 hour to about 10 days, with a recovery temperature of from about room temperature to about 300° C. In implementations, recovery can be passive, occurring at room temperature, or active, with heat applied. Recharging time can be from about 1 hour to about 10 days, with a recharging temperature of from about −200° C. to about 300° C. In implementations, the recharging stage can include liquids, gases, or supercritical fluids as described previously in regard to initial charging materials. In implementations, storage times may be from about 0.5 days to up to about 6 months, and temperatures from about −200 to about 40° C., with lower storage temperatures useful to prolong storage times and behavior of the expandable pellets 600. In certain implementations, the temperature can range from the temperature of liquid nitrogen to about the melting point of polyethylene terephthalate. In implementations, the expandable media can be stored in a container of liquid nitrogen.

Figure 7B:
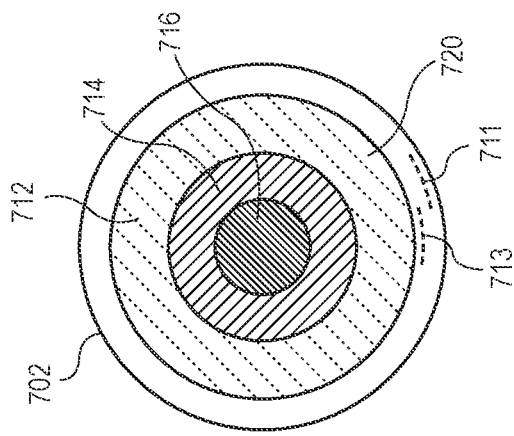
FIGS. 7A and 7B illustrate a re-usable expandable flexible carrier in perspective and in cross-section, respectively, according to an implementation of the present disclosure.
Figure 7A:
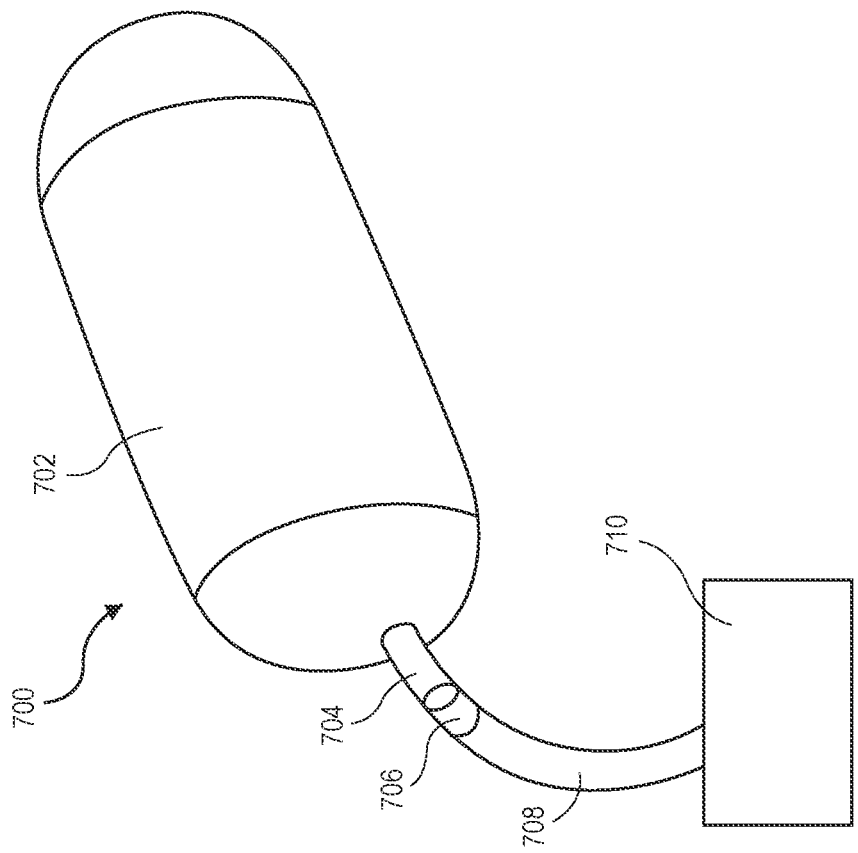

FIGS. 7A and 7B illustrate a re-usable expandable flexible carrier in perspective and in cross-section, respectively, according to an implementation of the present disclosure. A re-usable expandable flexible carrier 700 in an isolated view in FIG. 7A, without being placed within a mold or mold assembly as described previously in regard to FIGS. 1-4. The expandable flexible carrier 700 includes a flexible skin 702 having an expandable flexible carrier conduit 704 attached. The expandable flexible carrier conduit 704 is connected to a charging source conduit 708 via a coupler 706, and ultimately a charging source 710. In some implementations, no expandable flexible carrier conduit 704 or charging source conduit 708 is required, allowing the charging of the expandable flexible carrier 700 to be filled with a blowing agent via the flexible skin 702 as described in regard to alternate implementations of the present teachings.

The charging source 710 can be or include a cartridge containing a blowing agent. In other implementations, the charging source 710 can include a gas cylinder, compressor, regulator, and the like, or other means of introducing, re-introducing, or removing a blowing agent known to one skilled in the art. In implementations, the removal of a blowing agent can facilitate a reduction in pressure or expansion of the expandable flexible carrier for the purposes of safety or general pressure regulation during operation. In some implementations, the expandable flexible carrier 700 can be or include a bladder, expandable tube, inflatable sac, bag, container, receptacle, or other monolithic flexible carrier configured as described herein. FIG. 7B is a cross-section of the expandable flexible carrier 700 which shows a similar construction as the recycle expandable pellet 100 as described previously in regard to FIG. 5. In addition to the flexible skin 702, the expandable flexible carrier 700 further includes an outer layer 711 and an inner layer 713 in some implementations. Additionally, the expandable flexible carrier 700 includes a polymer matrix 712, which can further include a blowing agent 720, an expandable core 714, and a metal nucleus 716. In certain implementations, the flexible carrier encapsulates the aforementioned features of the expandable member system. It should be noted that in alternate implementations the charging source 710 can be internal to the expandable flexible carrier 700 rather than external as shown in FIG. 7A. For example, the charging source 710 can replace or be interchangeable with one or more of the internal layers depicted in FIG. 7B, such as, for example, the metal nucleus 716, thus providing an expandable flexible carrier with an internal charging source. Internal charging sources such as this may require an alternate mechanism for an expandable flexible carrier conduit 704 or charging source conduit 708 that connects with or introduces and/or re-introduces a blowing agent into the expandable flexible carrier 700.

In some implementations, the flexible skin 702, polymer matrix 712, expandable core 714, metal nucleus 716, and blowing agent 720 are made of similar materials and configured similarly as described in regard to the recycle expandable pellet 100 of FIG. 5. The charging source 710 is configured to introduce blowing agent 720 into one or more of the expandable media 700 or expandable flexible carrier system 700. Likewise, the charging source 710 can be used in some implementations to charge a plurality of recycle expandable pellets 100. In certain implementations, the charging source 710 can include materials previously described in the present teachings and be configured to introduce a blowing agent 720 into either a plurality of recycle expandable pellets 100 or an expandable flexible carrier 700. Similar to previously described implementations, the expandable flexible carrier 700 can include where the polymer matrix 712 is configured to hold the expandable core 714, and the flexible skin 702 configured to encapsulate the polymer matrix 712 and the expandable core 714, wherein the flexible skin 702 is at least partially permeable with respect to the expandable core 714 or a gas released by the expandable core 714.

Figure 8A:
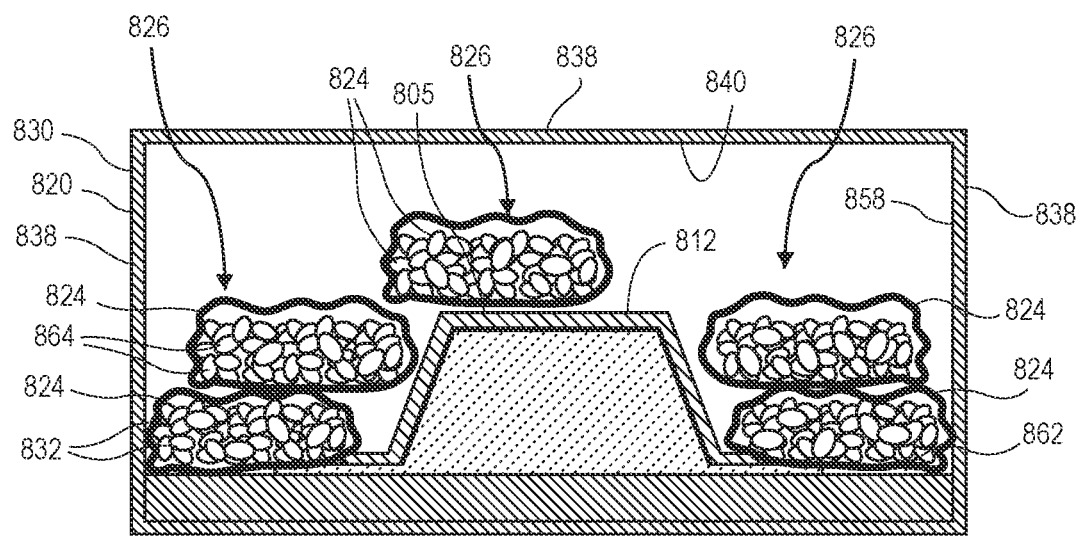
FIGS. 8A and 8B illustrate a re-usable expandable container in a charged and an expanded state, respectively, according to an implementation of the present disclosure.
Figure 8B:
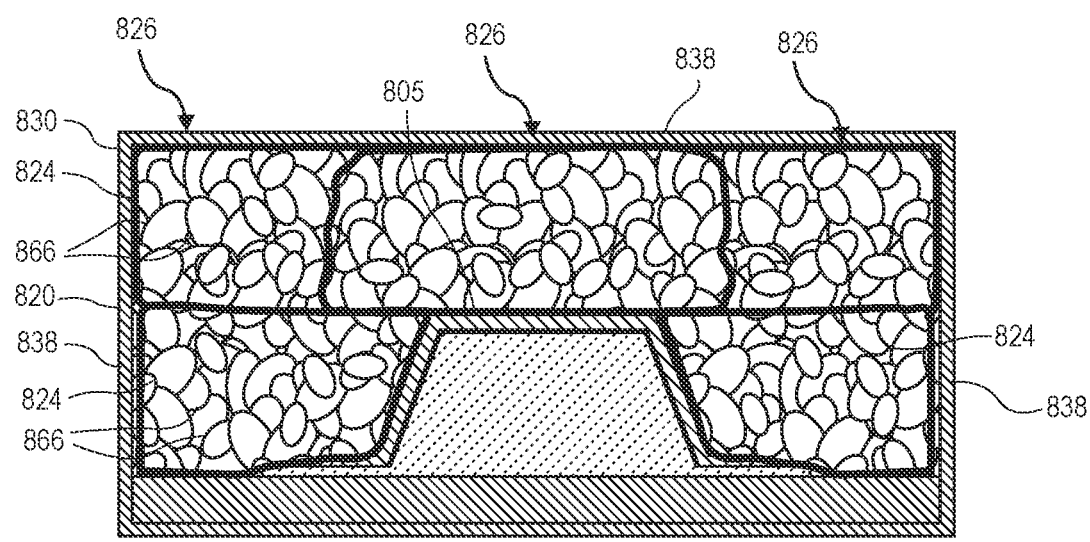

FIGS. 8A and 8B illustrate a re-usable expandable container in a charged and an expanded state, respectively, according to an implementation of the present disclosure. FIG. 8A schematically depicts a plurality of bag assemblies 826, comprising expandable containers 824 that are at least partially filled with expandable pellets 864. Expandable container assemblies 826 are shown disposed within constraining container 830 with a workpiece assembly 812, including an uncured composite workpiece 805. In particular, where workpiece 805 is disposed within interior volume 840 of container 820, expandable container assemblies 826 or expandable containers 824 can be disposed around an uncured composite workpiece 805 as to substantially surround the workpiece, and may further contact substantially onto noncompressible floor 862. A variety of expandable containers 824 or expandable pellets 864 can be used to construct expandable container assemblies 826. Such expandable containers 824 can be configured to contain expandable pellets 864 and are additionally configured to permit the expandable pellets to expand (e.g., to apply a predetermined pressure to interior surfaces of an internal volume containing the expandable container, as described above). Expandable container 824 can be selected so that it simply provides sufficient internal volume that the full expansion of expandable pellets 864 within expandable container 824 is accommodated. Alternatively, or in addition, the material of expandable container 824 can be selected to be partly or wholly expandable (stretchable) itself, so that the expansion of expandable pellets 864 can be accommodated by expandable container 824. In certain implementations, the expandable container outer material is flexible or expandable in order to accommodate one or more expandable pellets 864 contained within. It should further be noted that the expandable container 824 material may be permeable to one or more blowing agents such that the blowing agent may be introduced or released in a controlled fashion as needed during operation or use. The stretchable encapsulating material can include at least one of silicone, rubber, thermoplastic polyurethane (TPU), polyethylene terephthalate (PET), polycarbonate (PC), and polyethylene (PE).

Where such expandable media is employed in curing the uncured composite workpiece 805, container 820 can be a constraining container 830 that is configured so as to be capable of being sealed, and to withstand internal pressure against inner surfaces 858 of container walls 838. Workpiece assembly 812 is disposed within an exemplary constraining container 830, where constraining container 830 is constructed so as to facilitate the application of pressure upon uncured composite workpiece 805 by the expansion of an expandable container 824. Constraining container 830 is configured to enclose workpiece assembly 812, so that container walls 838 define an interior volume 840 within constraining container 830 and intermediate inner surfaces 858 of container walls 838 and the outer surface 860 of uncured composite workpiece 805. The addition of expandable element to container interior volume 840, in an amount sufficient to make contact with both uncured composite workpiece 805 and inner surfaces 858 permits the generation and application of pressure upon surface 860 of workpiece 805 when expandable container 824 is expanded.

Constraining container 830 is typically constructed so that the addition of workpiece assembly 812 and subsequent addition of expandable container 824 is facilitated, as well as removal of the expanded element and workpiece after curing is completed. Constraining container 830 can incorporate a removable upper surface, or lid, or feature one or more removable panels to provide access to the interior of the container. Any type of sealable opening is an appropriate opening, provided that when it is sealed, the container can withstand the pressure generated within the container.

FIG. 8B depicts the constraining container 830 of FIG. 8A during or after workpiece 805 being cured. Interior volume 840 of constraining container 830 is substantially filled with expandable container assemblies 826, which comprise expandable containers 824 that now enclose expanded pellets 866. Expanded pellets 866 can be extracted from interior volume 840 of constraining container 830 by opening the container and removing expanded expandable container assemblies 826 from the container while some or all of the expanded pellets 866 remain contained in expandable container 824. Where expanded expandable container assemblies 826 are removed from container 820 intact, with expanded pellets 866 remaining confined within expandable container 824, no clean-up of spilled or lost pellets is required. However, expanded pellets 866 can alternatively be removed from constraining container 830 by opening one or more expandable container assemblies 826 and extracting the expanded pellets 866 from expandable container 824. In order to facilitate the removal of expanded pellets 866 from expandable container 824, the walls of expandable container 824 can include a hatch, door, zipper, and/or any other closure assembly configured to be opened and closed again without damaging expandable container 824. In implementations, the pellets 864, 866 can be re-charged after recovery as disclosed previously herein, either while still contained in the expandable container 824 or after being removed from the expandable container 824.

Figure 9:
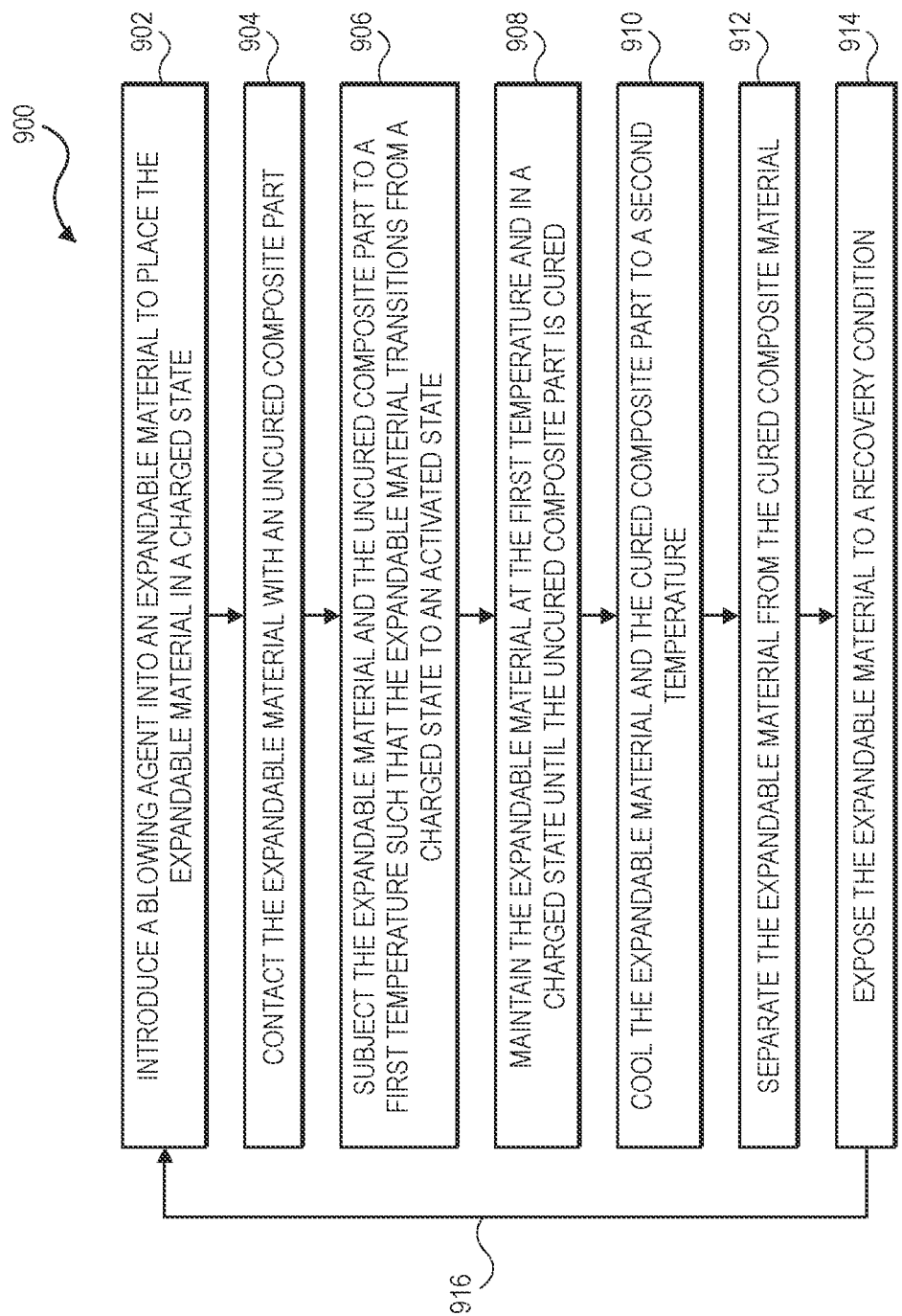
FIG. 9 illustrates a method for curing composite parts, according to an implementation of the present disclosure.

FIG. 9 illustrates a method for curing composite parts, according to an implementation of the present disclosure. FIG. 9 illustrates an example of a method that, for instance, could be used with the systems or materials described in any of the preceding FIGS. 5-9B. As such, the discussion below will reference various components as illustrated in FIG. 5-9B. The method of curing a composite part 900 includes steps including introducing a blowing agent into an expandable material to place the expandable material in a charged state 902, contacting the expandable material with an uncured composite part 904, and subjecting the expandable material and the uncured composite part to a first temperature such that the expandable material transitions from a charged state to an activated state 906. The expandable material is then maintained at the first temperature and in a charged state until the uncured composite part is cured 908. The first temperature is from about 100° C. to about 450° C. Next, the expandable material and the cured composite part are cooled to a second temperature 910 and the expandable material is separated from the cured composite material 912. The second temperature is from about room temperature to about 200° C. Finally, the expandable material is exposed to a recovery condition 914. The recovery condition comprises a third temperature and a period of from about 0.5 hours to about 10 days, and the third temperature is from about room temperature to about 300° C. In certain implementations, the entire method including the preceding steps or alternate steps or conditions described herein are repeated which can include re-charging the expandable material 916, allowing re-use of the expandable material. In implementations, the expandable material includes a polymer matrix configured to hold the blowing agent, and a flexible skin configured to encapsulate the polymer matrix and to restrict an escape of the gas to control an expansion of the expandable material. In various implementations, the method of curing a composite part 900 includes storing the expandable material in the charged state after introducing a blowing agent into the expandable material. Storing the expandable material in a charged state comprises a fourth temperature of from about −200 to about 40° C. for a time up to six months. The method of curing a composite part 900 can include re-charging the expandable material after exposing the expandable material to the recovery condition. In implementations, re-charging the expandable material includes exposing the expandable material to a re-charging temperature about −200° C. to about 300° C. for 1 hour to about 10 days. Certain examples include where the expandable material comprises a plurality of pellets, or alternatively, the expandable material includes a flexible carrier. In still other examples, the expandable material includes a combination of a plurality of pellets and a flexible carrier.

Figure 10:
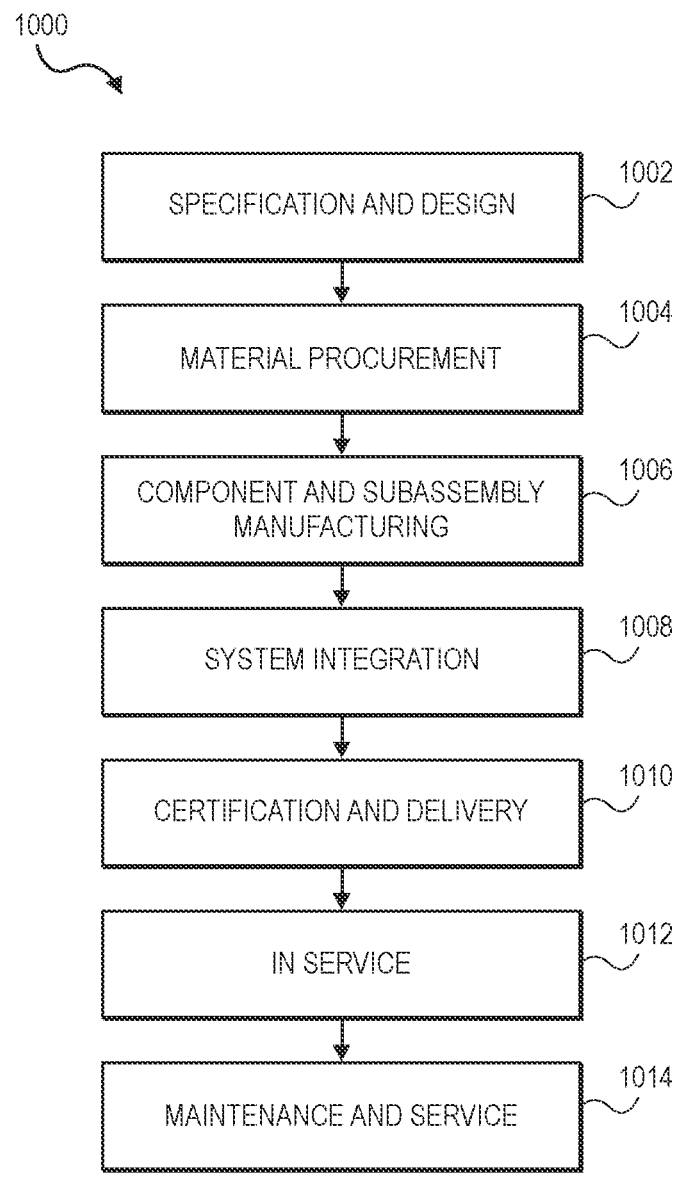
FIG. 10 illustrates a flow diagram of aircraft production and service methodology, according to an implementation of the present disclosure.
Figure 11:
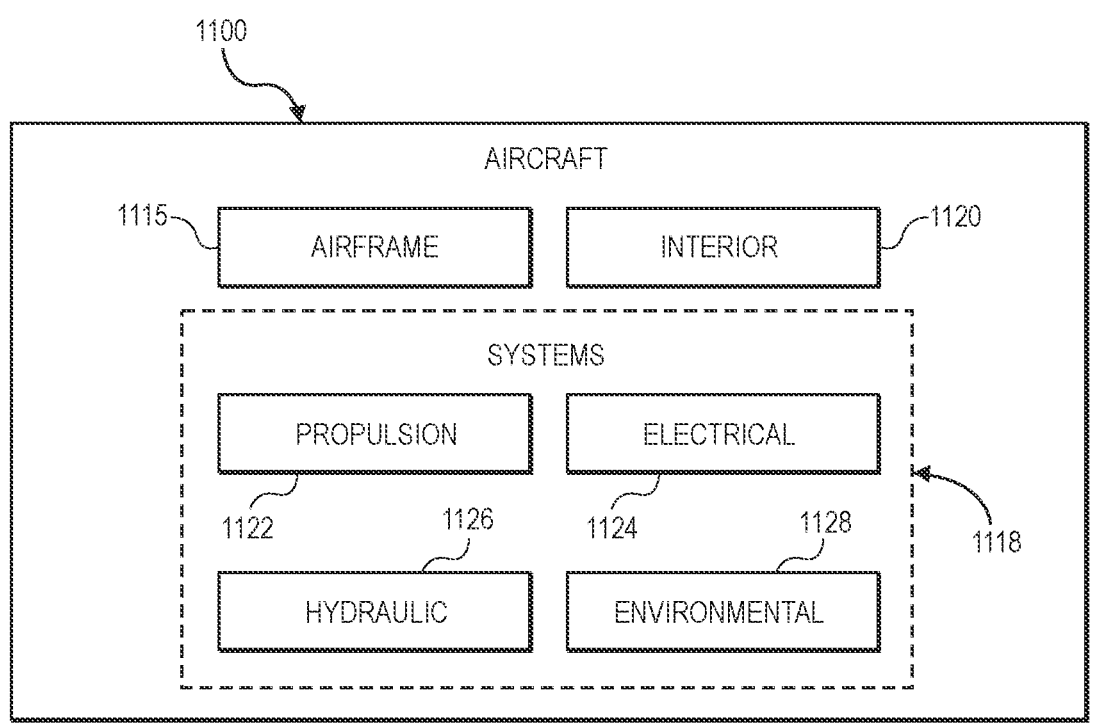
FIG. 11 illustrates a block diagram of an aircraft, according to an implementation of the present disclosure.

FIG. 10 illustrates a flow diagram of aircraft production and service methodology, according to an implementation of the present disclosure. FIG. 11 illustrates a block diagram of an aircraft, according to an implementation of the present disclosure. Implementations of the present disclosure may find use in a variety of potential applications, particularly in the transportation industry, including for example, aerospace, marine, automotive applications, and other application where curing of composite parts are desired. Thus, referring now to FIGS. 10 and 11, implementations of the disclosure may be used in the context of an aircraft manufacturing and service method 1000 as shown in FIG. 10 and an aircraft 1100 as shown in FIG. 11. During pre-production, exemplary method 1000 may include specification and design 1002 of the aircraft 1100 and material procurement 1004. During production, component and subassembly manufacturing 1006 and system integration 1008 of the aircraft 1100 takes place. Thereafter, the aircraft 1100 may go through certification and delivery 1010 in order to be placed in service 1012. While in service by a customer, the aircraft 1100 is scheduled for routine maintenance and service 1014, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 1100 produced by exemplary method 1000 can include an airframe 1115 with a plurality of systems 1118 and an interior 1120. Examples of systems 1118 include one or more of a propulsion system 1122, an electrical system 1124, a hydraulic system 1126, and an environmental system 1128. Any number of other systems may be included. Although an aerospace example is shown, the principles of the disclosure may be applied to other industries, such as the marine and automotive industries.

Further, the disclosure comprises examples according to the following clauses:

Clause 1. A material system, comprising: a plurality of expandable pellets, comprising: a polymer matrix configured to hold an expandable core; and a flexible skin configured to encapsulate the polymer matrix; and wherein the flexible skin is at least partially permeable with respect to the expandable core or a gas released by the expandable core.

Clause 2. The material system of Clause 1, wherein the polymer matrix comprises a thermoplastic polymer.

Clause 3. The material system of Clause 2, wherein the polymer matrix comprises at least one of thermoplastic urethane (TPU), polyolefin, fluoropolymers, polyesters, polyimides, polyamide, polycarbonate, Acrylonitrile butadiene styrene (ABS), polyvinyl chloride (PVC), polymethyl methacrylate (PMMA), ethylene-vinyl acetate (EVA), polyethylenimine (PEI), polyphenylsulfone (PPSU), polyethersulfone (PESU), polyether ether ketone (PEEK), polyetherketoneketone (PEKK), polyvinylidene fluoride (PVDF), polyphenylene sulfide (PPS), thermoplastic elastomer (TPE), and rubber.

Clause 4. The material system of any of Clauses 1-3, wherein the flexible skin comprises a thermoplastic elastomer (TPE).

Clause 5. The material system of Clause 4, wherein the flexible skin comprises at least one of silicone, rubber, thermoplastic polyurethane (TPU), Polyethylene terephthalate (PET), polycarbonate (PC), and polyethylene (PE).

Clause 6. The material system of any of Clauses 1-5, further comprising a charging source configured to introduce blowing agent into one or more of the expandable pellets.

Clause 7. The material system of Clause 6, wherein the charging source further comprises dry ice.

Clause 8. The material system of Clause 6 or 7, wherein the blowing agent comprises carbon dioxide.

Clause 9. The material system of any of Clauses 6-8, wherein the blowing agent comprises air or nitrogen.

Clause 10. The material system of any of Clauses 6-9, wherein the charging source further comprises a cartridge.

Clause 11. An expandable member system, comprising: an expandable member comprising: a polymer matrix configured to hold an expandable core; and a flexible skin configured to encapsulate the polymer matrix and the expandable core; and wherein the flexible skin is at least partially permeable with respect to the expandable core or a gas released by the expandable core.

Clause 12. The expandable member system of Clause 11, wherein the polymer matrix comprises at least one of thermoplastic urethane (TPU), polyolefin, fluoropolymers, polyesters, polyimides, polyamide, polycarbonate, Acrylonitrile butadiene styrene (ABS), polyvinyl chloride (PVC), polymethyl methacrylate (PMMA), ethylene-vinyl acetate (EVA), polyethylenimine (PEI), polyphenylsulfone (PPSU), polyethersulfone (PESU), polyether ether ketone (PEEK), polyetherketoneketone (PEKK), polyvinylidene fluoride (PVDF), polyphenylene sulfide (PPS), thermoplastic elastomer (TPE), and rubber.

Clause 13. The expandable member system of Clause 11 or 12, wherein the flexible skin comprises at least one of silicone, rubber, thermoplastic polyurethane (TPU), Polyethylene terephthalate (PET), polycarbonate (PC), and polyethylene (PE).

Clause 14. The expandable member system of any of Clauses 11-13, further comprising a flexible carrier configured to encapsulate the expandable member.

Clause 15. The expandable member system of any of Clauses 11-14, further comprising a charging source configured to introduce blowing agent into the expandable member.

Clause 16. The expandable member system of Clause 15, wherein the charging source is external to the expandable member system.

Clause 17. The expandable member system of Clause 15, wherein the charging source is internal to the expandable member system.

Clause 18. A method of curing a composite part, comprising: introducing a blowing agent into an expandable material to place the expandable material in a charged state; contacting the expandable material with an uncured composite part; subjecting the expandable material and the uncured composite part to a first temperature such that the expandable material transitions from a charged state to an activated state; maintaining the expandable material at the first temperature and in a charged state until the uncured composite part is cured; cooling the expandable material and the cured composite part to a second temperature; separating the expandable material from the cured composite material; and exposing the expandable material to a recovery condition; and wherein the expandable material comprises a polymer matrix configured to hold the blowing agent, and a flexible skin configured to: encapsulate the polymer matrix; and restrict an escape of the blowing agent to control an expansion of the expandable material.

Clause 19. The method of Clause 18, wherein: the recovery condition comprises a third temperature and a period of from about 0.5 hours to about 48 hours; the first temperature is from about 150° C. to about 300° C.; the second temperature is from about 25° C. to about 90° C.; and the third temperature is from about 25° C. to about 300° C.

Clause 20. The method of Clause 18 or 19, further comprising storing the expandable material in the charged state after introducing a blowing agent into the expandable material.

Clause 21. The method of any of Clauses 18-20, wherein storing the expandable material in a charged state comprises a fourth temperature of from about 25° C. to about 35° C. for a time from about 24 hours to about 72 hours.

Clause 22. The method of any of Clauses 18-21, further comprising re-charging the expandable material after exposing the expandable material to the recovery condition.

Clause 23. The method of any of Clauses 18-22, wherein re-charging the expandable material comprises exposing the expandable material to a re-charging temperature for about 0.5 hours to about 2 hours.

Clause 24. The method of any of Clauses 18-23, wherein the expandable material comprises a plurality of pellets.

Clause 25. The method of any of Clauses 18-24, wherein the expandable material comprises a flexible carrier.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or examples of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated example. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other examples of the present teachings may be apparent to those skilled in the art from consideration of the specification and practice of the disclosure herein. It is intended that the specification and examples be considered as exemplary only, with a true scope and spirit of the present teachings being indicated by the following claims.

We claim:

1. A material system, comprising:
a plurality of expandable pellets, comprising:
a polymer matrix configured to hold an expandable core; and
a flexible skin configured to encapsulate the polymer matrix; and
wherein the flexible skin is at least partially permeable with respect to the expandable core or a gas released by the expandable core.

2. The material system of claim 1, wherein the polymer matrix comprises a thermoplastic polymer.

3. The material system of claim 1, wherein the flexible skin comprises a thermoplastic elastomer (TPE).

4. The material system of claim 1, further comprising a charging source configured to introduce blowing agent into one or more of the expandable pellets.

5. The material system of claim 1, wherein the polymer matrix comprises polymethyl methacrylate (PMMA).

6. The material system of claim 1, wherein a melting point of the polymer matrix is from about 200° F. to about 400° F.

7. The material system of claim 1, wherein the flexible skin further comprises an outer coating comprising PTFE.

8. The material system of claim 1, wherein a melting temperature of the flexible skin is from about 80° F. to about 370° F.

9. The material system of claim 1, wherein a melting point of the polymer matrix is lower than a melting point of the flexible skin.

10. The material system of claim 4, wherein the charging source further comprises dry ice.

11. The material system of claim 4, wherein the blowing agent comprises carbon dioxide.

12. The material system of claim 4, wherein the charging source further comprises a cartridge.

13. An expandable member system, comprising:
an expandable member comprising:
a polymer matrix configured to hold an expandable core; and
a flexible skin configured to encapsulate the polymer matrix and the expandable core; and
wherein the flexible skin is at least partially permeable with respect to the expandable core or a gas released by the expandable core.

14. The expandable member system of claim 13, wherein the flexible skin comprises at least one of silicone, rubber, thermoplastic polyurethane (TPU), Polyethylene terephthalate (PET), polycarbonate (PC), and polyethylene (PE).

15. The expandable member system of claim 13, wherein the polymer matrix comprises polymethyl methacrylate (PMMA).

16. The expandable member system of claim 13, wherein the flexible skin further comprises an outer coating comprising PTFE.

17. The expandable member system of claim 13, further comprising a flexible carrier configured to encapsulate the expandable member.

18. The expandable member system of claim 13, further comprising a charging source configured to introduce blowing agent into the expandable member.

19. The expandable member system of claim 18, wherein the charging source is external to the expandable member system.

20. A material system, comprising:
  a plurality of expandable pellets, comprising:
    a polymer matrix configured to hold an expandable core; and
    a flexible skin configured to encapsulate the polymer matrix; and
      wherein the flexible skin is impermeable with respect to the expandable core or a gas released by the expandable core.

* * * * *